United States Patent [19]

Murdoch

[11] Patent Number: 5,153,583
[45] Date of Patent: Oct. 6, 1992

[54] TRANSPONDER

[75] Inventor: Graham A. M. Murdoch, Perth, Australia

[73] Assignees: Uniscan Ltd.; Magellan Technology Pty. Ltd., both of Western Australia, Australia

[21] Appl. No.: 499,294

[22] PCT Filed: Nov. 18, 1988

[86] PCT No.: PCT/AU88/00449
§ 371 Date: May 18, 1990
§ 102(e) Date: May 18, 1990

[87] PCT Pub. No.: WO89/05067
PCT Pub. Date: Jun. 1, 1989

[30] Foreign Application Priority Data

Nov. 18, 1987 [AU] Australia .................... PI5479

[51] Int. Cl.$^5$ .................................... H04B 7/00
[52] U.S. Cl. ........................... 340/825.54; 340/572
[58] Field of Search ............ 340/572, 573, 825.54; 342/44, 51

[56] References Cited

U.S. PATENT DOCUMENTS 3,964,024 6/1976 Hutton et al. ............... 340/825.34
4,345,253 8/1982 Hoover ............................ 342/44
4,630,044 12/1986 Polzer .......................... 340/825.72
4,724,427 2/1988 Carroll ........................... 342/44

FOREIGN PATENT DOCUMENTS

B55902 10/1986 Australia .
2163324A 2/1986 United Kingdom .

Primary Examiner—Donald J. Yusko
Assistant Examiner—Dervis Magistre
Attorney, Agent, or Firm—Baker & Daniels

[57] ABSTRACT

A portable passive transponder utilizes a single inductive coil transmission and reception system along with a single component rectifying means that is integratable on a single chip. The single coil is adapted to receive a power and/or information signal from an interrogator and transmit another signal simultaneously and independently of the power and/or information signal. A phase coherent frequency multiplier is also utilized which allows higher frequencies than the power signal to be generated, transmitted, and coherently detected.

62 Claims, 15 Drawing Sheets

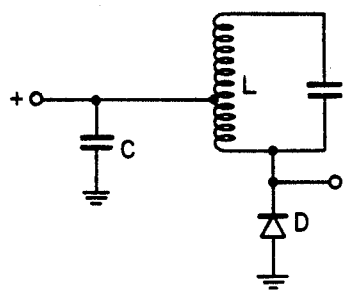
FIG. 2C
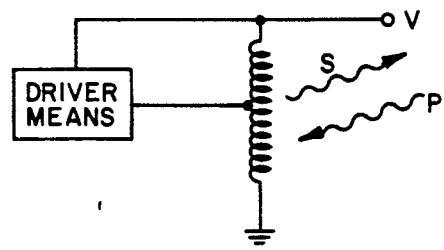
FIG. 3A
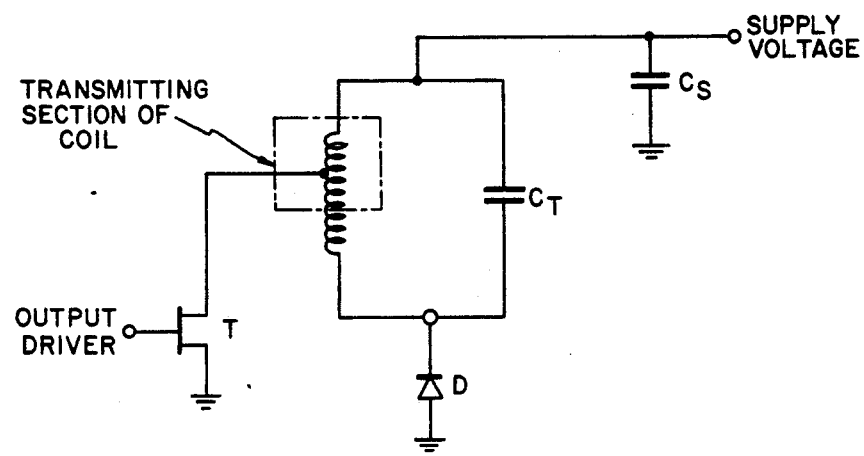
FIG. 3B
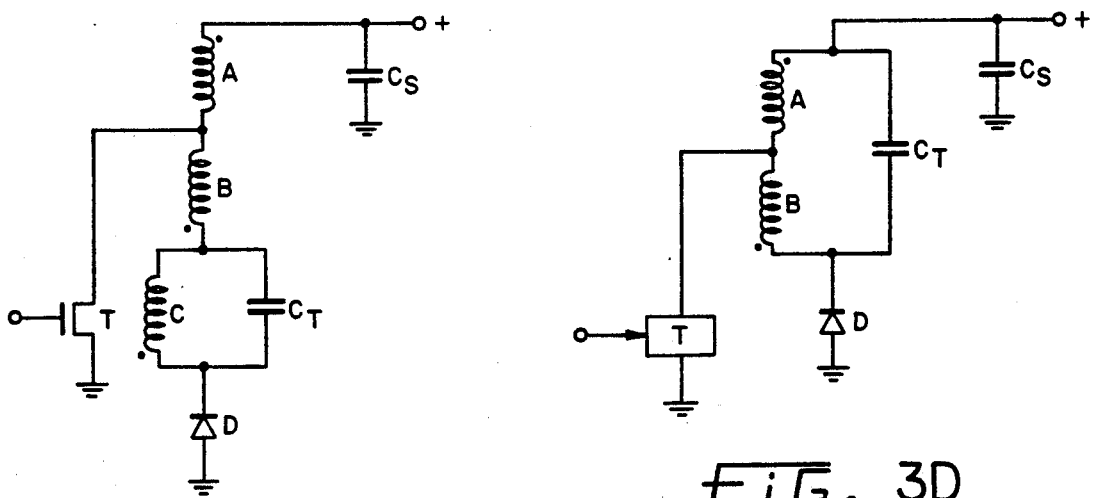
FIG. 3C
FIG. 3D

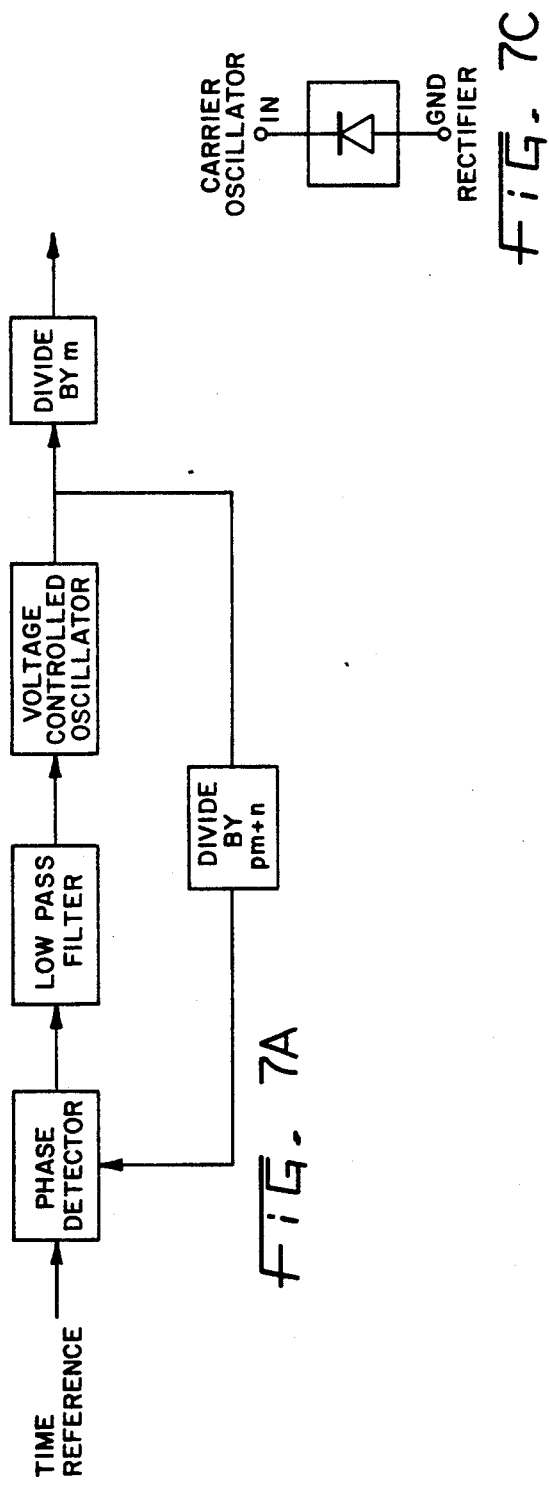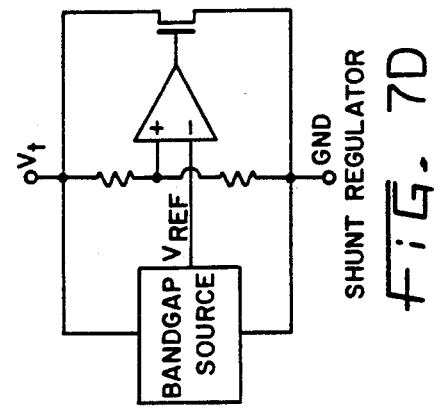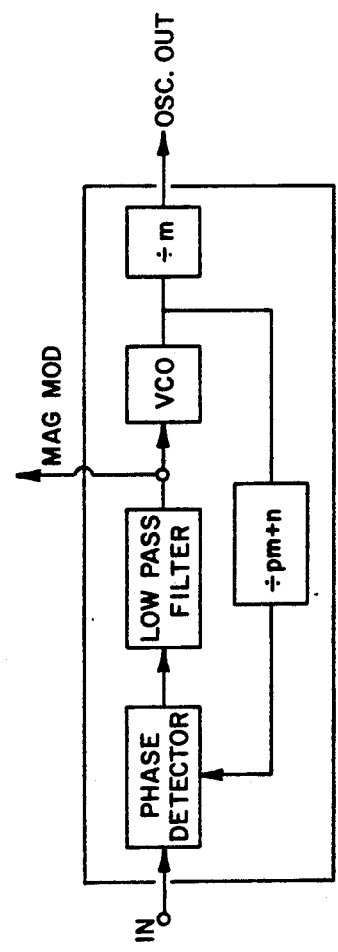

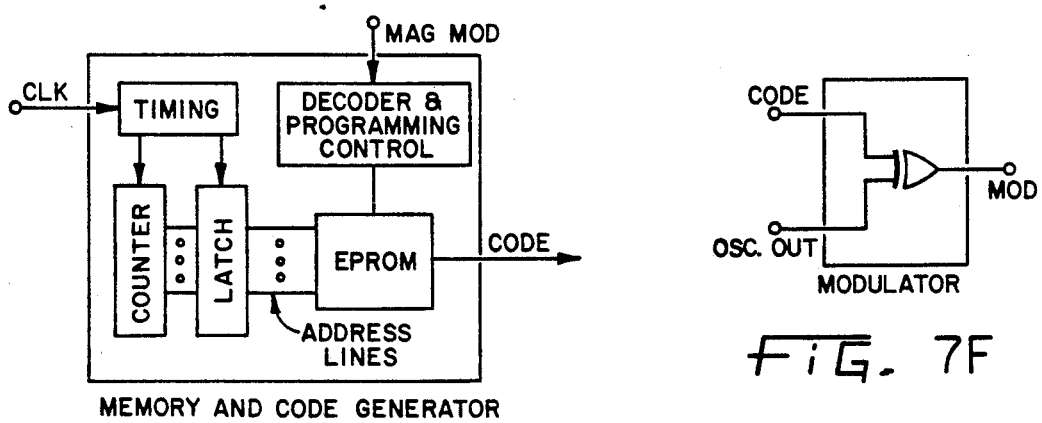
FIG. 7E — MEMORY AND CODE GENERATOR
FIG. 7F — MODULATOR
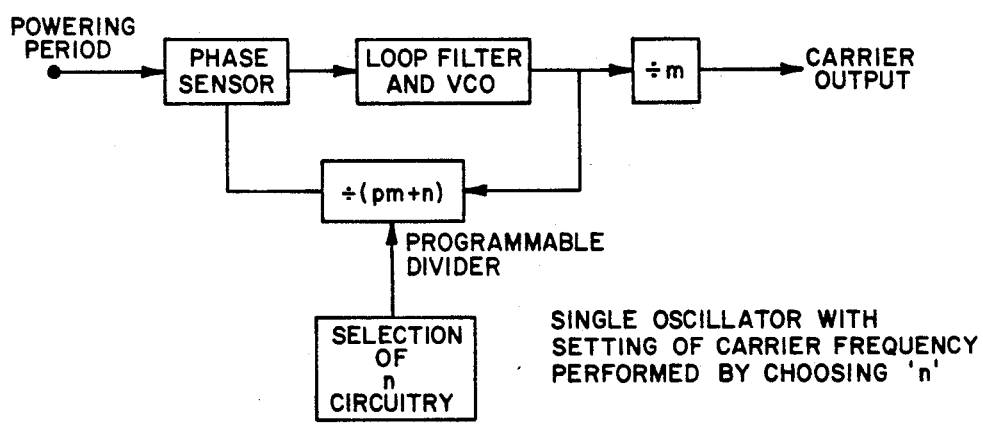
FIG. 7G — SINGLE OSCILLATOR WITH SETTING OF CARRIER FREQUENCY PERFORMED BY CHOOSING 'n'
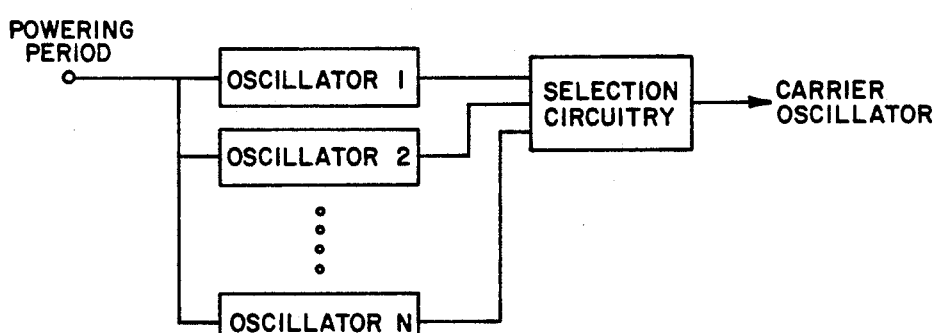
FIG. 7H — INDIVIDUAL PRESET OSCILLATORS, CARRIER FREQUENCY SELECTED BY CHOOSING OUTPUT FROM (AT LEAST) ONE OSCILLATOR

STEP CAPACITANCE CHANGE
WHEN VOLTAGE EQUALS ZERO

OPEN SWITCH INSERTS
RESISTANCE INTO TUNED CIRCUIT

CLOSING SWITCH INSERTS
RESISTANCE INTO TUNED CIRCUIT $I_{OUT} = m \times (I_1 + I_2 + ... + I_n)$ $m$ = MIRROR CURRENT GAIN

TRANSPONDER

BACKGROUND OF THE INVENTION

1. Field of Invention

The present invention relates to electronic and inductive communication apparatus'. Specifically, the present invention relates to a transponder, more particularly, a passive transponder. The passive transponder may be inductively powered and may store information or perform electronic functions when it is so powered. The transponder of the present invention relates to a portable, integrated and relatively cheap apparatus advantageously adapted for interrogation and/or identification of an article with which the transponder is associated. The transponder of the present invention advantageously utilises a single coil transmission and reception system. Furthermore, the unique circuit arrangement(s) of the present invention provides a single component rectifying means. The present invention lends itself to integration in a single chip form. The means used to receive a power providing signal may also be used to transmit another signal, the reception and transmission occurring in a simultaneous manner.

2. Description of the Related Art

The Applicant is aware of U.S. Pat. No. 3,859,624, which discloses two types of transponder used within an identification tag system. One form of the transponder disclosed therein includes an inductive powering field receiving coil and a separate coplanar coded information field generator coil. The power receiving coil has associated therewith a rectifier, regulator and energy storage device. The separate information coil is used as a transmitter means to an interrogation station. Each coil operates independently of the other.

The identification tag system further includes an interrogation station comprising an inductive power field generator, for the first type of tag discussed above, and an information code receiver. The interrogation station disclosed utilises a unitary coil for both the power field generation and the coded information receiver. The interrogator means, however, operates in a sequential and cyclic fashion. A first mode comprises AC power (inductive) generation by the interrogator for a finite time. A second mode, during which no AC (inductive) power is radiated to the transponder, the interrogator operates as a receiver to receive a coded information signal for a finite time. These modes are performed continuously and sequentially. No disclosure exists of simultaneous power and data reception with data transmission.

There are a number of patents utilising the principle outlined most clearly by Vinding U.S. Pat. No. 3,299,424 but in face first detailed by Brard U.S. Pat. No. 1,744,036.

In U.S. Pat. No. 3,299,424, power is radiated from a transmitter (or interrogator) and received by a tuned circuit in the transponder. The power signal induces a current to flow in the transponder's tuned circuit. This current radiates a transmission signal from the transponder's tuned circuit which is detected at the interrogator. By varying any parameter of the tuned circuit (such as tuning or loss) the induced current's phase or magnitude can be caused to vary. Thus coded data modulating a parameter of the transponder's tuned circuit can be detected and decoded by suitable circuitry at the interrogator.

The crucial point is that the current induced in the transponder's tuned circuit, by the interrogator, generates the reply signal that carrier data back to the interrogator. The "carrier" frequency for this data signal is almost invariably the same as the interrogator's power signal. A number of disclosures rely upon the generation of sub-harmonic currents, by a suitable switch means, from the current induced in the transponder's tuned circuit, i.e. Harris U.S. Pat. No. 2,979,321 and Sellers U.S. Pat. No. 4,314,373 which cannot operate with fewer than two tuned circuits. Once again the actual current in the transponder's tuned circuit directly generates the transmission signal for carrying data.

The distinctive difference is that the carrier signal is not injected into the pickup coil. This limits the transmission signal to be the same frequency or a sub-harmonic of the interrogation signal and precludes the simultaneous reception and transmission of data by the transponder's tuned circuit.

Other disclosures which essentially operate in the same or a similar manner to that of Vinding U.S. Pat. No. 3,299,424 include: U.S. Pat. Nos. 4,075,632; 4,196,418; 4,333,073; 4,361,153; 4,546,241; 4,580,041; and 4,654,658.

U.S. Pat. No. 4,040,053 relates to a microwave system. Power is transmitted in high frequency pulses. The pulse frequency is used as the timebase reference for the transponders internal logic. Without the pulses the transponder's internal logic cannot be clocked. The present invention can either directly use the period of the power field as a clock reference or, in a preferred form, derive the clock from an internal oscillator. If the external interrogation signal is momentarily absent proper clock signals will still be generated by the oscillator. For U.S. Pat. No. 4,040,053 the reply transmission can only occur during the interrogator's power phase. When the pulse is absent no reply carrier is generated. This reply carrier frequency is fixed at a preset harmonic of the interrogation frequency and cannot be varied at will. Data cannot be transmitted to the transponder because the circuit uses the pulse signals to clock the internal logic. All data is preprogrammed onto the transponder.

It should be noted that in U.S. Pat. No. 4,040,053 data transmission by the transponder does and can only occur simultaneously with the power pulse from the interrogator. The interrogation signal is frequency doubled and reradiated back at the interrogator. Rather than the transmission reply signal being generated and injected into the antenna by the transponder electronics circuitry.

Three tuned circuits are required to receive power and generate the information transmission. There are power rectifiers and a "frequency translation" device which are not integratable.

In U.S. Pat. No. 4,730,188 the transponder described utilises FSK data transmission at integer sub-harmonics of the interrogation frequency. The circuits disclosed are not integrable and no provision for the reception of data is made.

The circuit disclosed uses a full wave bridge rectifier to convert the received AC voltage in the PIT coil to DC voltage for the transponder electronics. Full wave rectifiers are considered impossible to integrate using commercial NMOS, CMOS or, at the power levels required, bipolar processing lines. This contrasts with the rectifying structure(s) employed by the present invention which may be readily integrated, whether a diode, synchronous rectifier, or other rectifier means is employed.

Data is outputted as a binary FSK data stream both frequencies being a subharmonic of the power field. No provision is made to generate frequencies greater than the power field's frequency. This contrasts with the special phase coherent frequency multiplier which may be used in the present invention and which allows higher frequencies to be generated, transmitted and coherently detected. High frequencies couple more efficiently from the transponder back to the interrogator.

The adoption of FSK signalling results in a far wider spectral spread on the transmission data than direct modulation (BPSK or QPSK for example) used by the present invention. The two FSK carriers are envelope modulated by the data and data complement respectively. The data spectrum convolves with each FSK carrier. The total data stream bandwidth is double that of any single carrier system. The extra bandwidth required to receive the data signal degrades the systems noise and interference performance.

A data signal is transmitted from the PIT using two open collector output stages each with a series current limiting resistor in their respective collector circuits. These resistors are connected to opposite sides of the PIT. The transistors are driven with complimentary signals and are driven hard "on" forcing them to act as switches. The resistors serve to limit the current flow from the PIT. The dual complimentary drive stage is provided to force signal currents through the PIT coil. Proper operation of this output drive stage is dependent upon two factors, namely the bridge rectifier being connected across the PIT, and the carrier frequency being less than the powering frequency.

The bridge rectifier operates to ensure that the voltage between each side of the PIT and Vss is either zero or greater than zero. During each half cycle the bridge connects alternate sides of the coil to Vss and Vdd respectively. The voltage on the coil side connected to Vdd is a half sinewave. The currents drawn through 4R1 and 4R2 are likewise half sinewaves. The total current through the PIT consists of half sinewave pulses directed through whichever output resistor (4R1, 4R2) is active.

With the outputs driven by FSK the signal current through the PIT consists of a burst of half sine current pulses through 4R1 followed by a burst of half sine current pulses through 4R2. The period of these bursts being determined by the period of the keying frequency.

Clearly this system is incapable of accurately transmitting a frequency higher than the powering frequency without tolerating amplitude modulation of the data by the PIT voltage. Such heavy high frequency amplitude modulation makes detection and demodulation of the data a complex and difficult process. The present invention may inject any frequency(s) of current (both higher or lower than the power field's frequency) without any modulation, amplitude or otherwise, of the injected current due to the voltage induced in the antenna coil by the powering field. Any choice of transmission modulation (amplitude, FSK, phase etc.) can be used with complete disregard for the interrogation signal.

The external bridge rectifier and series connected resistors (4R1, 4R2) of U.S. Pat. No. 4,730,188 are crucial to the operation of that transponders communication channel. Neither of these components have been disclosed in an integrated form nor in a readily integratable form. The rectifier and current source advantageously sued in the present invention lend themselves to integration within a fully customised integrated circuit.

With particular reference to line 23 in column 3 the transponder outputs are transistor switches that "sink" current through their respective series collector resistors. The output stage is not a current source, a current source being an element which constrains the current independently of the voltage across it. The output current is grossly affected by the PIT voltage, i.e. heavily amplitude modulated. The series collector resistors provide the only current restricting function. The circuit is incapable of envelope shaping the data transmission bandwidth to bandlimit the transmission signal.

In the present invention, by the careful selection of the output transistor current source, rectifier and antenna configuration, far fewer components are required for power reception and data transmission, i.e. only 1 transistor and 1 rectifier versus 2 transistors, 2 resistors and 4 rectifiers of the prior art.

The maximum voltage at any part of the PIT coil is (Vdd−Vss) i.e. peak pickup voltage. Whereas the voltage point in the present invention has a voltage of twice the peak voltage. This is ideally suited as a programming voltage for electrically erasable memory (EEPROM) which requires a high programming voltage. The circuit of the present invention automatically supplies this high programming voltage if it is required.

U.S. Pat. No. 4,724,427 describes a transponder that utilises a single antenna coil to receive power and transmit data.

The central feature of this disclosure is the use of a specially designed diode bridge (4 diodes minimum—5 diodes are actually used) to simultaneously perform the tasks of: (1) Rectification, and (2) Modulation. The bridge acts to rectify the power received by the transponder's antenna. Additionally, it can be caused to "mix" an encoded data signal with the power frequency. This "mixing" action results in the generation of new frequencies at the sum and difference between the power frequency (fc) and the encoded data frequency (fd), where fd=fc−n, i.e., fc−fd and fc+fd.

Unlike the present invention those embodiments of U.S. Pat. No. 4,724,427 using a single antenna do not have power reception and information transmission occurring simultaneously and independently. Data carrying sum and difference frequencies are only generated by the action of both the power frequency and the encoded data frequency in the diode bridge. Data cannot be transmitted unless the power signal is present. The frequencies available for data transmission are constrained to be near the carrier frequency i.e., fc.(1+1/n), fc(1−1/n).

Modulation of the power signal to programme data/commands into the transponder cannot occur simultaneously with the transmission of data by the transponder. The modulation sidebands in the power signal mix with the transponder's data sidebands in the diode bridge mutilating the transponder's data, and possible the power modulation. Additionally, the data clock is directly derived from the power frequency. Frequency or phase modulation of the carrier will similarly modulate the data clock further corrupting the sum and difference sidebands.

A principle distinction between U.S. Pat. No. 4,730,188, U.S. Pat. No. 4,724,427 and the present invention is that the prior art requires the carrier signal to be present for the generation of the data transmission. The present invention not only does not require the power signal to generate the information transmission signal, but can transmit the signal with and independently of the powering signal.

U.S. Pat. No. 4,724,427 presents a diagram in which the transponder antenna and circuitry are incorporated onto a single chip. While such a small transponder would find many uses it suffers from the deficiency of not being reprogrammable "on the fly" i.e. while being interrogated.

Such an ability of highly advantageous for such applications as smart cards where frequent infield reprogramming occurs as a matter of normal operation.

OBJECT(S) OF THE PRESENT INVENTION

An object of the present invention is to provide a transponder which includes a single coil adapted for simultaneous inductive power field reception and code information transmission.

A further object of the present invention is to provide a disposable transponder, or code tag.

A further object of the present invention is to provide a transponder which has reduced interference capabilities with another transponder, when both transponders simultaneously transmit an information code to an interrogation station.

Another object of the present invention is to provide a transponder in which the electronic circuitry therefor is adapted for substantially complete integration to a single (IC) chip form.

Another object of the present invention is to provide a transponder which includes a unique power receiving and information transmitting coil structure and/or minimum configuration rectification and energy storage devices.

Yet another object of the present invention is to provide a device which allows data receiving simultaneously with power receiving and information transmission.

Overall, an object of the present invention is to provide a transponder which alleviates or does not suffer any one of or all the disadvantages of the prior art.

SUMMARY OF THE INVENTION

The present invention may provide a device including an electronic circuit for generating or storing and transmitting an information signal when under the influence of an inductive powering field, said device comprising an inductive means wherein at least a portion of said inductive means is arranged to transmit said information signal and said inductive means is arranged for simultaneous and independent influence by said powering field to provide power for transmitting said information signal.

The present invention may also provide a device comprising inductive means being adapted to provide power for a driver means when under the influence of an inductive powering field, a said driver means adapted to control at least a portion of said inductive means for radiating an information signal, said at least a portion of said inductive means being adapted to simultaneously provide the power to said driver means and radiate said information signal.

The present invention may provide a transmitter/receiver device comprising:

inductive means adapted to receive an inducive power field, rectifier means coupled between one side of said inductive means and a point of reference potential, said inductive and rectifier means operatively coupled to provide a powering voltage at another side of said inductive means, driver means coupled to said inductive means and adapted to selectively cause a current to flow from said another side through at least a portion of said inductive means whereby said portion radiates an information signal, said portion of said inductive means simultaneously and independently receiving said field and transmitting said signal.

The present invention may also provide in combination, an inductive field receiving means, a driver means, rectifier means and a charge storage means wherein said combination provides a passive transponder and further wherein said driver means and said rectifier means are provided in a single integrated chip form.

The present invention may provide a transponder for communicating with a base station, said base station adapted for interrogation and/or powering of the transponder, said transponder comprising:

inductive means for receiving an inductive powering field, said field inducting a first signal in said inductive means, rectifier means for rectifying said first signal, said rectifier means being coupled between one side of said inductive means and a reference potential point, storage means for storing the rectified first signal in the form of a voltage, said storage means being coupled between another side of said inductive means and said reference point, said another side of said inductive means being a voltage potential point when said inductive means receives said inductive field, said storage means adapted to provide voltage to said voltage point, driver means being selectively enabled to provide a conductive path through at least a portion of said inductive means such that when said conductive path is provided a current produces, in said portion, an irradiating second signal, said inductive means being adapted to simultaneously receive said powering field and transmit said second signal in response to said interrogation.

The present invention may also provide a transponder wherein the inductive means comprises tuned coil means.

The inductive powering field may further be modulated with a third signal, the third signal providing data and/or control signals to other components housed in said transponder.

The present invention may further provide an RF signal, or other information bearing signal, to selectively enable the driver means.

The transponder may be advantageously adapted for use in a system wherein two or more transponders can be simultaneously identified without regard to transponder orientation when subjected to the powering field. The system may include an acceptable failure rate criterion for transponder identification.

The transponder of the present invention may be integrated to IC chip form, the inductive means being provided externally to the chip in the form of a coil and the charge storage means being also provided externally in the form of a capacitor (a Z-folded capacitor and circuit assembly on which the chip may be placed; see co-pending Patent Application No. PI 5518, entitled "Improvements relating to Capacitor Construction" filed Nov. 20, 1987) or in the form of a conventional capacitor.

The transponder of the present invention may be further totally integrated to an IC chip form, the inductive means being formed on the surface of the IC chip itself.

The present invention preferably utilises a high frequency RF as data transmission carrier. Both data rate and transmission efficiency are proportional to data carrier frequency. Consequently this RF data transmission is capable of high data rates and good transmission efficiency.

The present invention is capable of simultaneously generating and transmitting a multiplicity of arbitrary data carrier frequencies independently modulated without regard for each other. The preferred data transmission frequencies are HF radio frequencies. High frequency radio transmission frequency will always provide superior signalling speed and coupling efficiency.

The present invention advantageously uses a PLL locked to the fundamental carrier as the timing reference guaranteeing a stable data clock.

The present invention is capable of being simultaneously read and reprogrammed by the interrogation station.

The irradiating second signal may be transmitted in the form of a transponder identification code at a single or plurality of frequencies selected randomly from a predetermined range or set of frequencies, the transmission and/or selection occurring in a continuous manner until the inductive means no longer provides power to the transponder.

BRIEF DESCRIPTION OF THE DRAWINGS

Preferred embodiments of the present invention will now be described with reference to the accompanying drawings, wherein:

FIG. 2C shows FIG. 2B with load matching.

FIG. 3A shows a receiving and simultaneous transmitting means. The transmitting section of the coil may comprise all or part of the coil.

FIG. 3B, 3C, 3D and 3E show variations of FIG. 3A.

FIGS. 7A to 7H show various forms of circuits for use in embodiments of the present invention.

DESCRIPTION OF THE PREFERRED EMBODIMENTS

Figure 1:
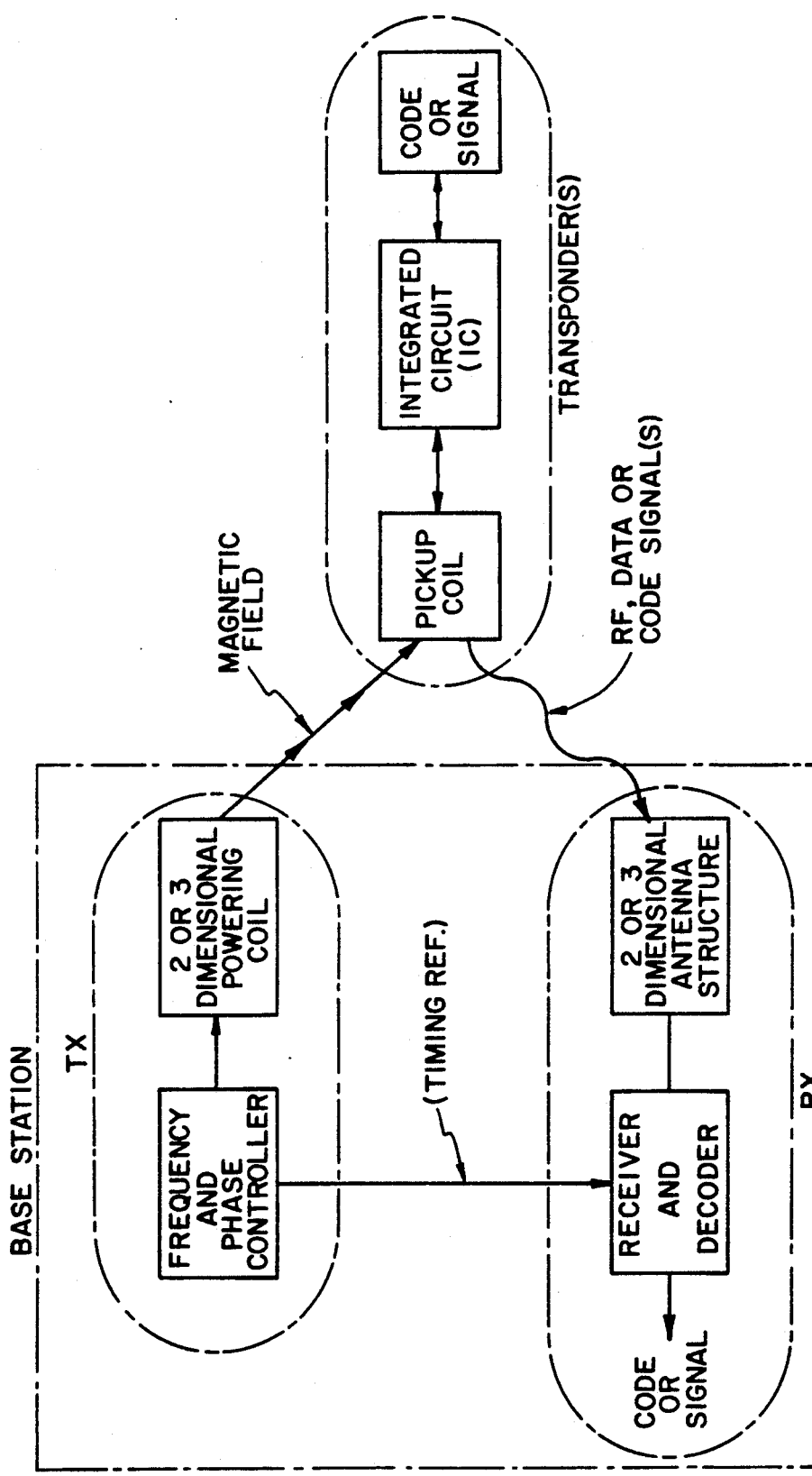
FIG. 1 shows a system in which the present invention is advantageously useable.

Briefly with reference to FIG. 1, an application of the present invention within a transponder system is discussed as follows.

An ultrasonically oscillating magnetic field may be generated from a base station by a resonant coil or set of coils. The transponder may contain a tuned pickup coil which may extract power and timing and/or other information from the magnetic field. The frequency, magnetic and/or phase of the magnetic field generated by the coil(s) may be carefully controlled to enable the power picked up by the transponder coil to be adequate for most transponder orientations. Identification codes and/or specially stored or other information may be transmitted from the transponder to a receiver, conventionally, by an RF or other suitable signal, depending upon the application of the transponder. Programming and/or interrogation of temporary or permanent memory on a selected transponder may be performed conventionally, for example, by modulation of the powering field. Frequency shift keying (FSK) is the preferred modulation method.

Furthermore, when a plurality of transponders are simultaneously used, in a transponder system, each transponder may generate one or more carrier frequencies from an available set of carrier frequencies. These carrier frequencies may not be harmonically related to the period of the powering magnetic field. By allowing each transponder to use any one or more of a multiplicity of available carrier frequencies, a number of transponders may be identified simultaneously under conditions where co-interference would normally preclude correct identification. The number of transmission carrier co-interference would normally preclude correct identification. The number of transmission carrier frequencies and/or transmission breaks (herein referred to as idle states) may be contingent upon the particular application. The particular mix of carrier frequencies and/or idle states may be chosen randomly. Inclusion of redundant frequency channels may guard against the possibility of chance external interference of a transponder transmission. Signals which may have been corrupted, or co-interfered with, may be statistically ignored. Each transponder may sequentially transmit an identifying code at a (randomly) selected frequency, selected from the band of available frequencies. The identifying code may be used to modulate the selected frequency. Any suitable modulation may be used.

A transponder may be used to identify objects, such as personnel, livestock, baggage, packages, manufactured goods, stock cargo, stolen goods, vehicles, trains, wagons, shipping containers and security cards, and many other things. Furthermore, it may be incorporated into systems requiring its internal identifying capabilities. For example, inventory control, token cards, debit cards, smart cards and computer security.

Figure 2A:
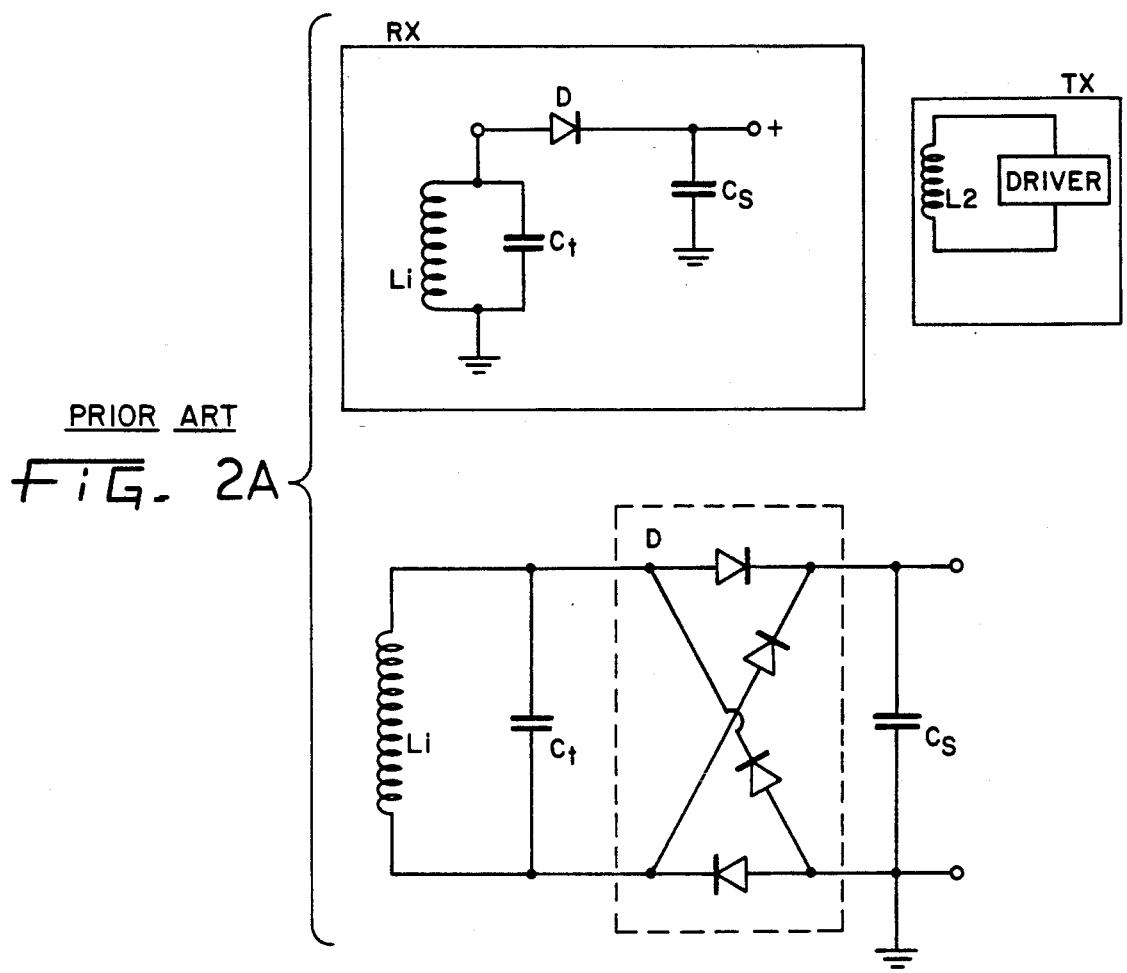
FIG. 2A shows a prior art arrangement for receiving power and transmitting an identifying code.

FIG. 2A shows two prior art arrangements used for receiving power and transmitting an identifying code. The receiving portion (RX) receives an inductive powering field. The RX arrangement stores a voltage in the storage capacitor (CS), which voltage is used by other circuits on the prior art transponder. It is noted that the rectifying structure (D), being position inter-adjacent the receiving coil and the storage capacitor serves only as a unidirectional regulator and does not allow current to flow from the storage capacitor, through the coil, to ground. While the prior art transponder is powered, the transmitter portion (TX) continuously transmits an identifying code at a predetermined frequency. A plurality of prior art transponders, when simultaneously powered, all transmit simultaneously at the same, set, predetermined frequency. As can be seen, the prior art does not lend itself to multiple transponders operation. Furthermore, the prior art does not include an interrogable and/or re-writeable transponder information, data or signal storage. More importantly, the prior art is not adapted to receive power and transmit data from a single coil, simultaneously.

Figure 2B:
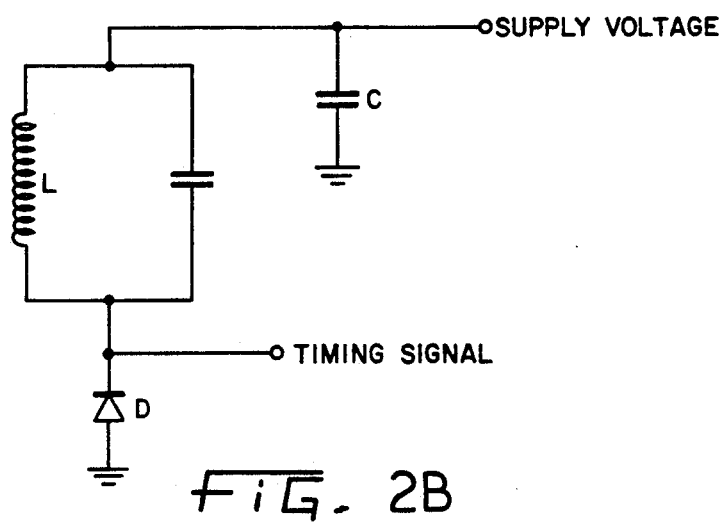
FIG. 2B shows a power and/or data or signal receiving portion of the present invention.

FIG. 2B shows a power and/or data receiving portion of the present invention. An externally applied inductive powering field may be applied to the coil (L). The field may be modulated with timing, data or other information to be used by the transponder. The coil may extract power and timing or data information, if any, from the applied field. One or more diodes may be used to rectify the voltage induced to the coil by the applied field. The addition of more complicated rectifying structures may not be necessary as they may not improve the dc conversion efficiency. The voltage drop across more than one diode may represent excess energy dissipation. The rectified voltage may be stored in the storage means (C). The stored voltage may be used to supply a dc voltage to transponder internal circuitry.

At the same time, if data or timing information is present in the applied field, diode(s) or any other demodulation means may be used to provide the timing and/or data information (shown as timing signal) for use by the transponder. The diode(s) may also interact with the charge storage means to set the supply voltage for the transponder.

A modified form of FIG. 2B is shown in FIG. 2C.

With regard to FIG. 2C, as is known for maximum power transfer from a tuned circuit to a load circuit, load loss must be substantially equal to the tuned circuit loss(es). Under these conditions, the output voltage will approach a maximum value. The embodiment as shown in FIG. 2C, may provide load matching, by tapping the pickup coil at an appropriate point. In this way, the coil may act like an autotransformer.

Figure 3E:
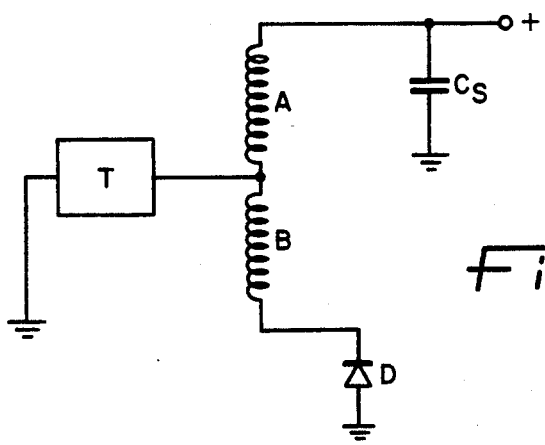

FIG. 3A shows a basic embodiment of the present invention. The inductive means may be divided into an upper (first) portion and a lower (second) portion. An impinging inductive powering field (P) may influence the inductive means (as a whole) to provide power (or a voltage) at point V. The power V may be used to drive or operate a driver means. The driver means may be coupled at the junction of the first and second portions of the inductive means. When the driver means is powered, it may control the first portion of the inductive means in a manner that makes the first portion radiate a signal (S). The radiating signal may be produced from the first portion at the same time the powering field is influencing the first and second portions. In other words, the present invention may provide a means whereby both power reception and signal transmission may be performed simultaneously from at least a portion of the means. In another form of embodiment, the inductive means may include only a first portion. In this case, the whole inductive means would operate to simultaneously receive power and transmit signal information.

FIG. 3B shows another embodiment of the present invention. When under the influence of an impinging inductive powering field, the inductive means may provide a signal. Rectifier means (D) or a diode may rectify the received signal and provide a voltage for storage in storage means (CS).

In other words, the rectifier means (D) and storage means (CS) may co-operate to form a useable voltage supply for use by other transponder circuitry. The rectifier means may rectify the received signal such that the storage means receives a signal burst, which is stored, and outputs a substantially constant voltage for the other transponder circuits until the stored voltage is either depleted or another signal burst replenishes the voltage stored in the storage means whereby the substantially constant voltage is continued to be provided. The rectifier means may also provide a clamping means for maintaining the output of the storage means at a substantially constant level, as long as the storage means has a useable charge stored therein. When a data signal is to be transmitted from the transponder, an appropriate signal may be applied to the point indicated as output driver. This may cause a conduction path to be selectively formed through all or part of the inductive means (the transmitting section). Because the rectifying means is placed between a point of reference potential and the inductive means, the inductive means is substantially isolated (in a signal sense) from the reference potential. Therefore, when the conduction path is formed, current flows from the voltage supply or another source other than the reference potential, through the inductive means (all or part thereof), thereby causing a signal to be radiated from the inductive means. In this way, a modulated radio frequency (RF) signal or another type of signal may be injected into the transmitting part of the inductive means.

A feature of the present invention is that a single antenna can be used for simultaneous powering, data reception and data transmission. These three operations occur independently of each other in the same antenna coil. Power is by induction which induces a voltage and current in the antenna coil. Received data is transmitted by frequency modulating the powering induction signal. Frequency modulation of the induction field does not effect the power received by the transponder's antenna coil. Isolation of the data transmission signal is achieved by injecting the transmission signal using a high impedance source (i.e. current source). Current injection does not affect the voltages induced by the powering field or the reception of the Rx data.

Several disclosed systems endeavour to isolate their transmitter stages from the antenna voltage by inserting an impedance, such as a capacitor or resistor, in series with the output driver. Integratability precludes the use of resistors or capacitors (of the necessary size) for this purpose.

The simplest practically integratable current source is a transistor operated in its current limiting region (i.e. linear region for a bipolar, and saturation region for a FET). The collector of a bipolar, or drain of a FET transistor, respectively function as current sources. The maintenance of current source action necessitates that the voltage across the transistor is always greater than the saturation voltage. This is typically 0.2 volts for bipolar transistor and roughly 1.0 volt for a FET.

Figure 11:
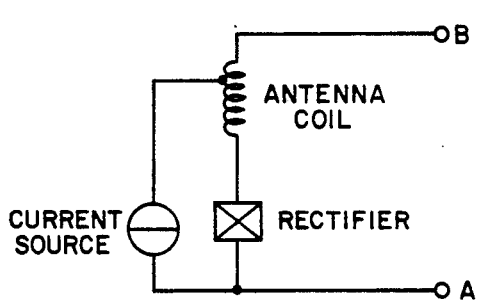
FIG. 11 shows an arrangement of a current source rectifier and antenna of the present invention.
Figure 12:
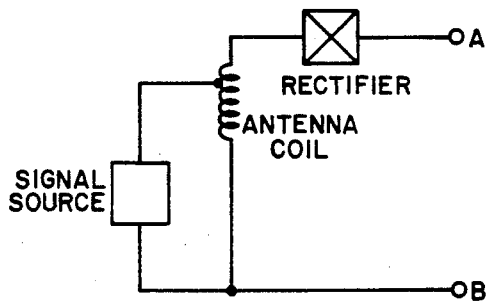
FIG. 12 shows a prior art arrangement.

FIG. 11 shows a basic circuit schematic which includes a current source output driver and rectifier to generate DC potential off the antenna coil. FIG. 12 shows a prior art basic schematic. Conventionally point "B" in FIG. 12 is chosen as the reference potential in transponder systems. By choosing "B" as the reference, the potential between B and any part of the antenna coil, including Vref, will swing above and below the reference potential during each cycle of the powering field. A transistor current source connected between the reference point and a tap off the coil will not work during the negative excursions of voltage. Alternatively by choosing "A" in FIG. 11 as the reference the potential between "A" and any point on the antenna coil will not change sign (be it negative or positive) for an ideal rectifier. Where there is a small voltage drop across the rectifier, Vref will experience a small change in voltage sign. The maximum magnitude of this is equal to the voltage drop across the rectifier. A tap off the antenna coil will not have this sign change and is an ideal point to connect a transistor current source.

Figure 13:
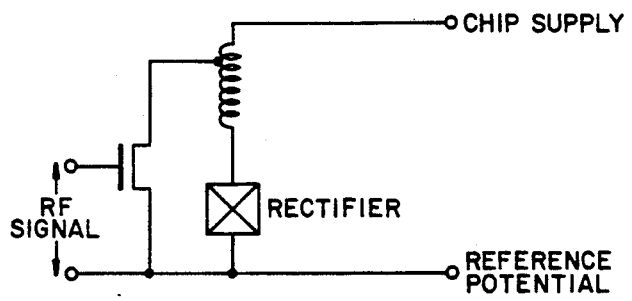
FIG. 13 shows an MOS arrangement of FIG. 11.

Circuit operation is independent of the direction of the diode rectifier, provided due care is taken with the selection of the current source transistor. FIGS. 13 shows a circuit optimised for an NMOS process. If PMOS is used, the potentials of all points are simply reversed. The critical point is that the rectifier and the current source must share the same potential point, with the other side of the rectifier connected to the end of the inductive antenna furtherest away from the other circuit potential point, and the other side of the current source connected to a tap off the inductive means. The circuit shown in FIG. 11 can be turned upside down without changing its operation and the D reference potential point chosen at B. Any form of unidirectional current flow control will work in the circuit, however a synchronous rectifier as detailed in copending Provisional Patent Application No. PI 5507, entitled "Integratable Synchronous Rectifier" filed Nov. 19, 1987, provides superior performance to a conventional diode.

Connecting the rectifying element to the reference potential allows simple and effective rectifying structures to be used which are readily integratable. The structure shown in FIGS. 13 is readily integratable with conventional NMOS and CMOS processing. Where the conventional "B" reference is used, the rectifying structures is difficult to integrate. The rectifier in FIG. 12 is impossible to integrate using conventional chip fabrication techniques.

Figure 14:
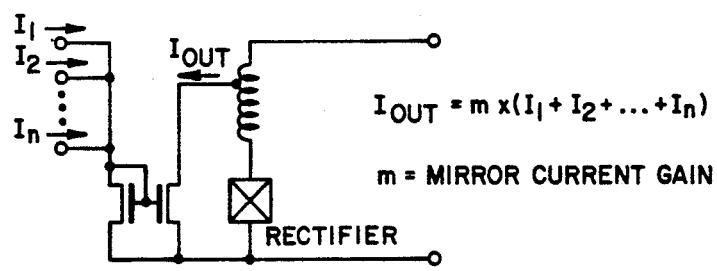
FIGS. 14, 15, 16A and 16B show alternative arrangements to that of FIG. 11.

A further advantage of the current source drive is the ability to deliver more than one signal simultaneously using the same transistor. FIG. 14 shows a current mirror (a commonly integrated structure) capable of delivering several currents of arbitrary frequency and waveform to the antenna coil. The currents I1, I2, ... In are linearly summed by the current mirror which outputs Iout. This allows two or more data signals at different frequencies to be simultaneously transmitted. The signals can have any arbitrary frequency and waveshape and still be transmitted independently by the antenna coil.

Figure 15:
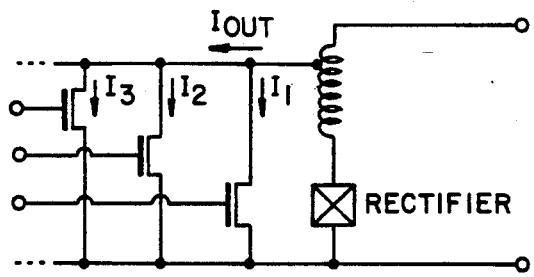

Alternatively, several output transistors can be paralleled and their respective output currents will sum linearly. FIG. 15 shows a simple circuit where the current from several output transistors are summed into the antenna coil.

The inductive means may comprise a coil preferably wire wound, the transmitting part thereof may therefore comprise all of the coil or only a few turns of wire. An antenna structure wiring an aluminum laminated plastic film as detailed in Australian Provisional Application No. PI 5855 (entitled "Antenna Structure, Power and Communication System and Methods", filed Dec. 10, 1987) is advantageously used here. The rectifier means may be used to rectify the voltage induced in the transponder pickup coil. Storage means, preferably a capacitor of an appropriate size and value, may be used to store the rectified voltage. Regulation of the voltage may be enhanced by ensuring that the transponder only moves through those regions of the inductive powering field which will give a tolerated and/or correct voltage. Regulation means may, alternatively, additionally be provided. The transponder may otherwise include a predetermined voltage cut-off means, the cut-off voltage being an induced voltage below which the transponder will not operate. A Zener diode in place of diode (D) in conjunction with the storage means may be used, and if rated at twice the required supply voltage, for example, will rectify the picked-up induced voltage and clamp the supply rail voltage to about one half the diode breakdown voltage until the transponder is no longer under the influence of the powering field.

Alternatively a shunt regulator placed across the antenna coil will effectively limit the DC voltage. Similarly a shunt regulator across the DC supply will limit the DC voltage, however a regulator on the DC line will, (1) contribute to discharging the storage capacitor increasing the supply voltage ripple.

(2) Necessitate a larger rectifier. Both the shunt and chip current must be drawn through the rectifier.

Both positions of regulator will function effectively, however, a DC supply shunt regulator is less desirable than a shunt regulator across the antenna.

Shunt regulation is chosen in preference to series regulation because:

(1) No series voltage drop across regulator hence the peak AC voltage is delivered to the chip.

(2) No excessively high voltages occur in the tuned circuit (due to strong inductive coupling) that are capable of destroying the chip transistors. A series regulator must be capable of withstanding the maximum peak input voltage. Voltage handling capability of a chip is a process dependent function and is limited to roughly 20 volts maximum. A shunt regulator constrains the voltage at the nominal operating voltage but must be capable of sinking sufficient current to maintain this regulation. Current handling capability is a function of transistor size which is directly under the designers control. Higher currents can be sunk by simply increasing the shunt transistor's size.

The switch means (T) operated by a driver signal may be a transistor or FET or any other appropriate switch means which may affect transmission through the coil. A tuning means (CT) may be used to tune the inductive means. The tuning means may include a capacitor. The tuning means may enhance the amplitude of signal(s) received and/or transmitted using the inductive means. The inductive means is preferably tuned to the received signal.

The tuning means electrically connects both ends of the coil together at RF frequencies, and hence to the reference potential through the storage capacitor. In effect the tuning and storing capacitors decouple both ends of the coil to the reference potential. Consequently the impedance of the rectifier has no effect upon the action of the RF currents injected into the coil.

FIGS. 3C and 3D show alternative embodiments of the present invention. In FIG. 3C, coils A, B and C may receive an applied powering field and coil A (and B if D conducts) may simultaneously transmit a signal (including dc and/or ac) when switch T causes a current to be drawn through A (and B when D conducts) and T to a reference rail. In FIG. 3D, coils A and B may simultaneously operate as receiver means and transmitter means.

In all cases, the transmitter means may be adapted to simultaneously operate as a receiver means. Separate coils, one for transmission, another for reception, may also be used in a transponder according to the present invention.

Figure 4:
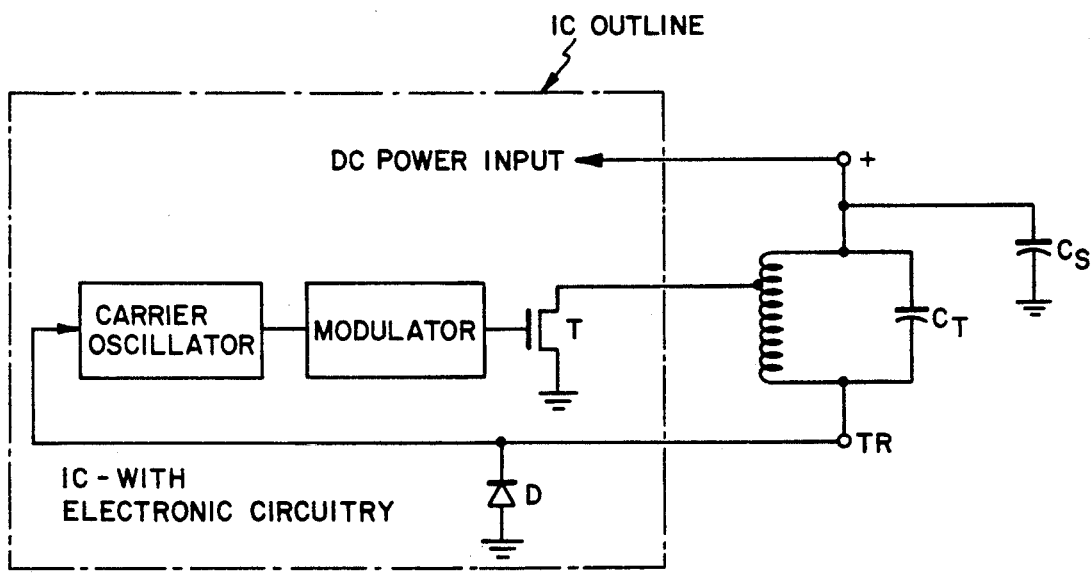
FIGS. 4 and 4A show embodiments of two transponders according to the present invention.
Figure 4A:
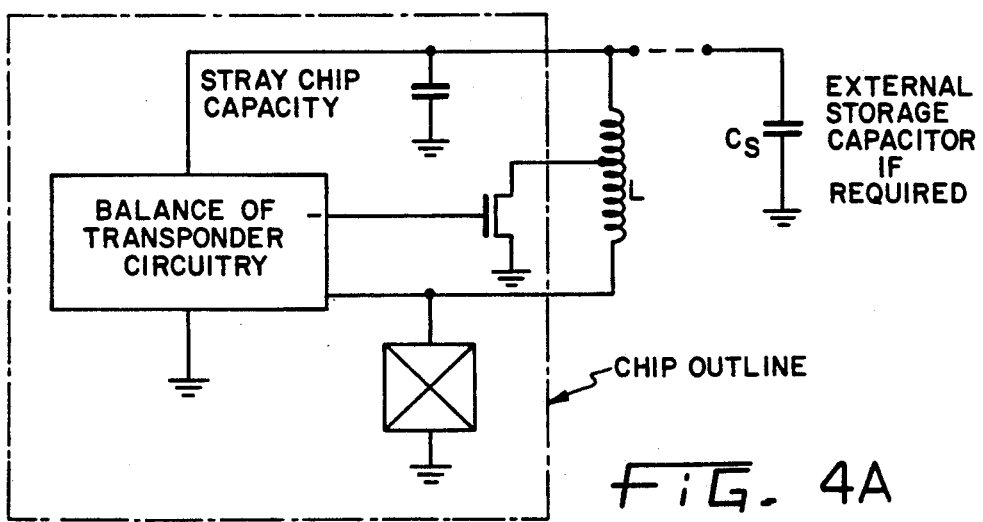
Figure 5A:
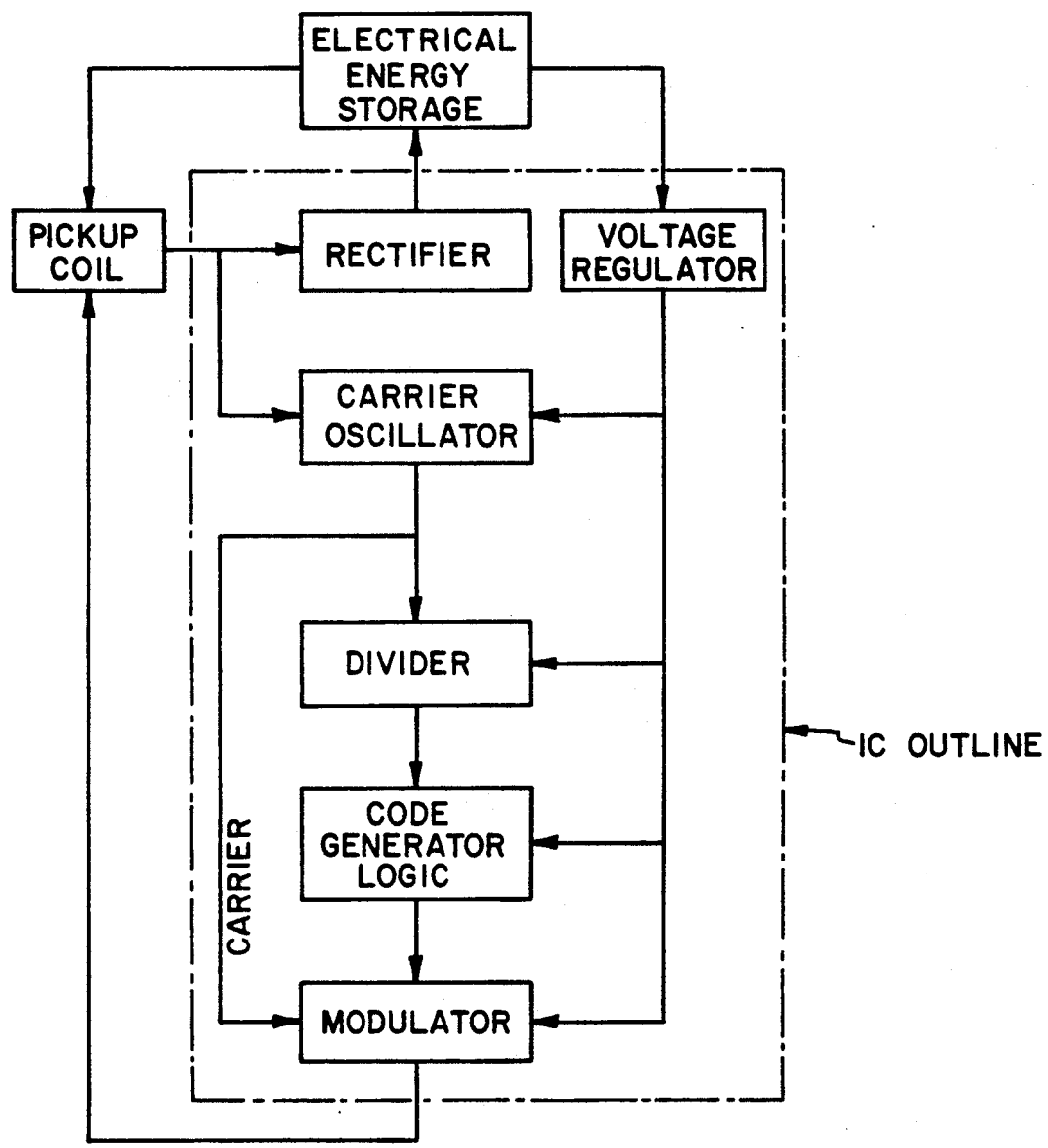
FIGS. 5A and 5B show further embodiments of the transponder according to the present invention.
Figure 5B:
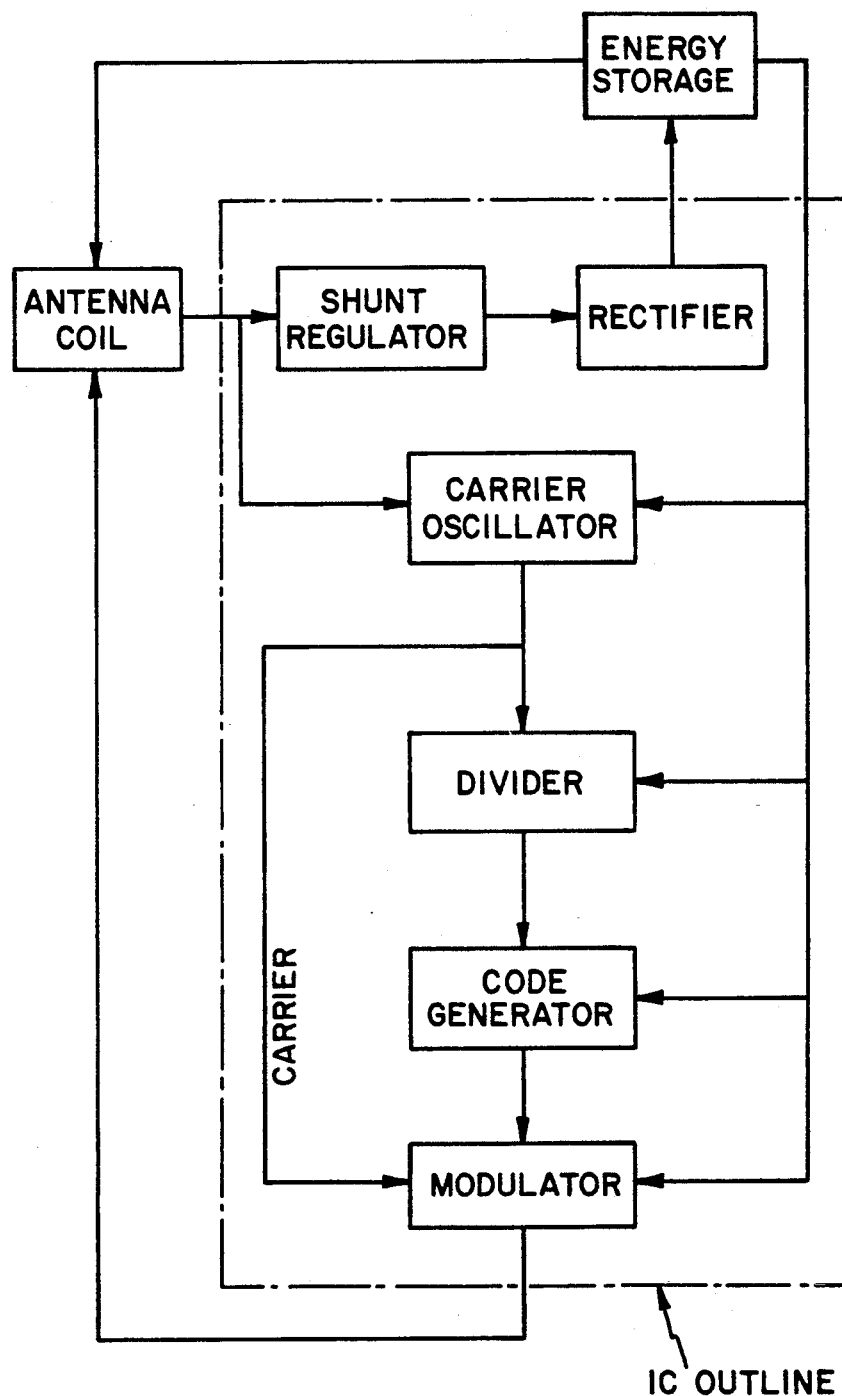
Figure 6A:
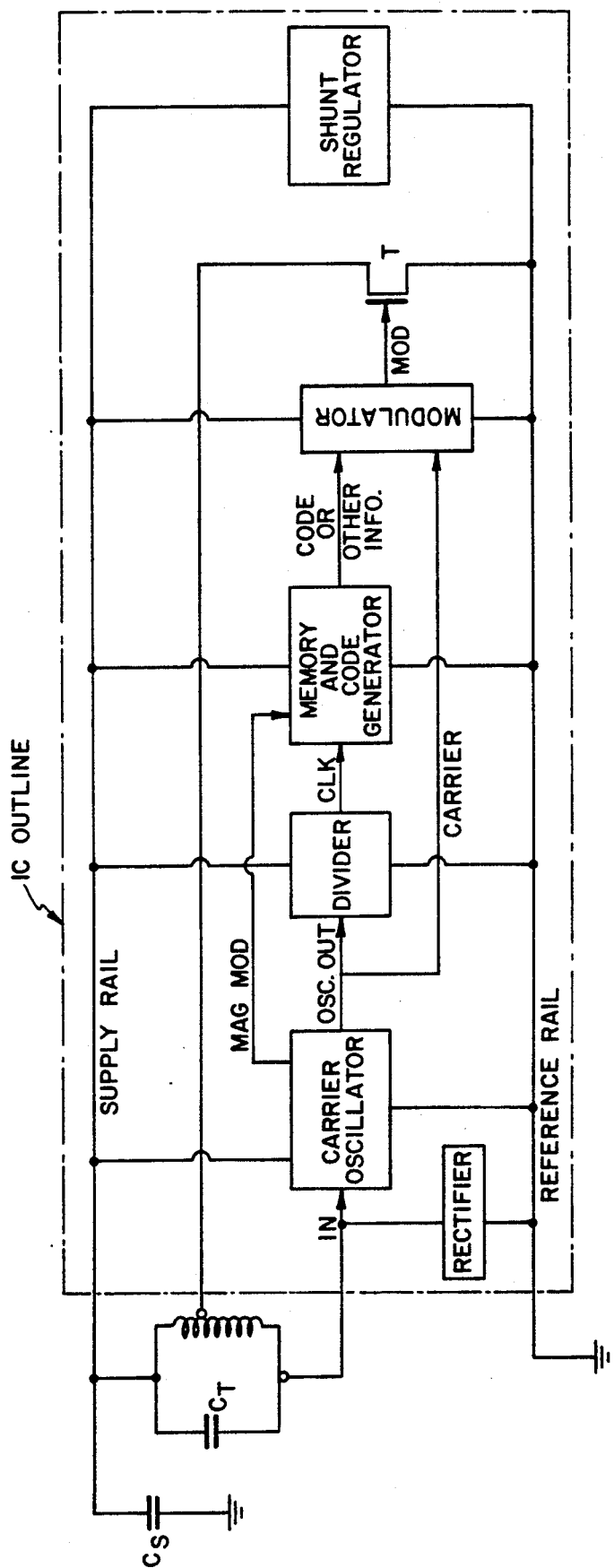
FIGS. 6A and 6B show further embodiments of the transponder according to the present invention.
Figure 6B:
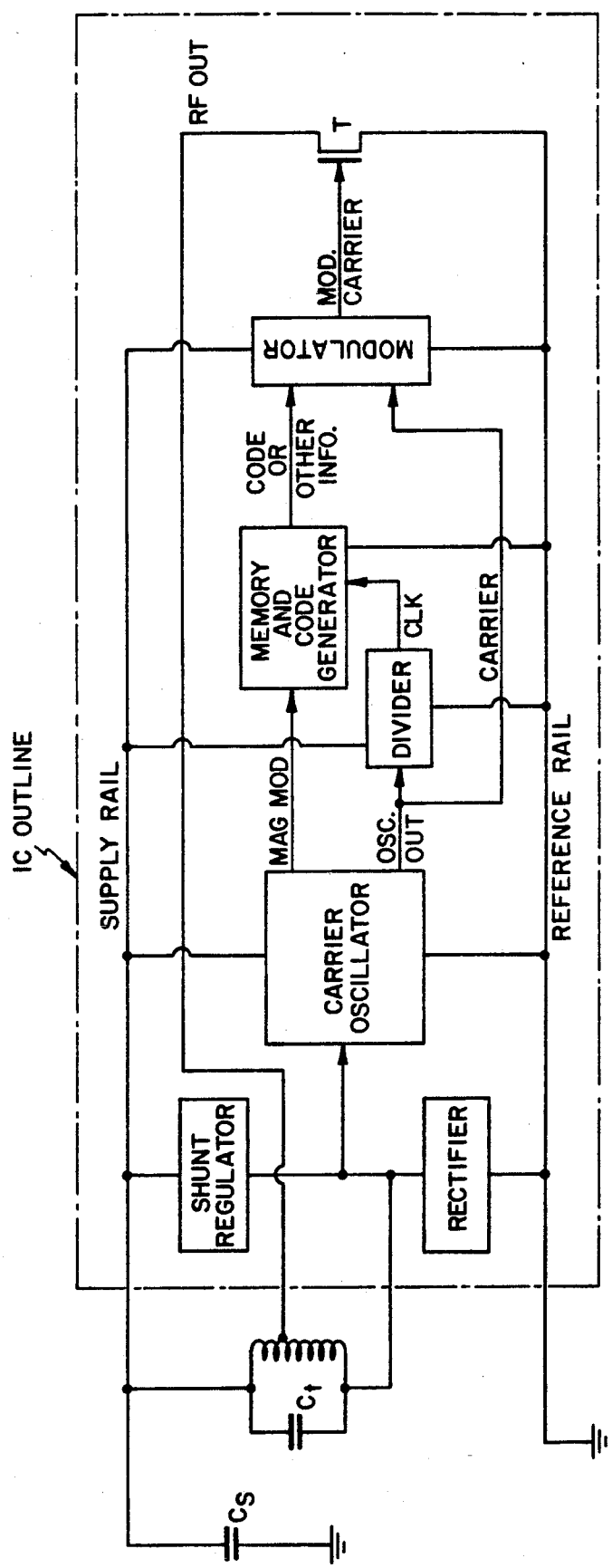

FIGS. 4, 4A, 5A, 5B, 6A and 6B, in general, show still further embodiment(s) of the present invention. FIGS. 4 and 4A show two embodiments in a transponder. FIG. 4A incorporates all circuitry onto the chip except the inductive means. Chip stray capacitance is utilized for charge storage, an external storage capacitor can be utilized if necessary. FIGS. 5A and 5B show an embodiment similar to FIGS. 4 and 4A but, wherein a coded information signal may be transmitted to a base station from the transponder via the coil, the code so transmitted being stored in the code generator logic. FIGS. 6A and 6B show an embodiment similar to FIGS. 5A and 5B but, wherein a 'MAG MOD.' signal, which may be superimposed on the power field received by the transponder, provides a means for an interrogating base station to alter, erase or add to information housed within the transponder or otherwise control the transponder, while the transponder is in situ. It is to be noted that any of the component parts (shown in the block form) may be implemented in a discrete component, hybrid or integrated form, or combination thereof, as may be common in the relevant arts or as required for each particular use of the present invention. Integration of electronic circuitry into chip form may provide an extremely cheap and compact form of transponder. An integrated capacitor (Z-folded capacitor and antenna circuit assembly detailed in a copending patent application) may be used as storage means (CS) and coil means, having mounted thereon, the transponder (IC) chip and a coil means. This combination may form a cheap, portable and/or disposable transponder.

Each transponder may have one or more antenna coils. All, or part of, any or each coil(s) may simultaneously be used to receive and transmit signals. Further description herein is made with reference to a single coiled inductive means in which only part of the inductive means is used to simultaneously transmit and receive signals for the transponder to minimise repetitive detailing.

An embodiment of the transponder may include the following:

1. An antenna coil for receiving power from an inductive powering field.
2. A tuning means, preferably a capacitance (CT), for tuning the antenna coil to substantially the frequency of the inductive field.
3. A dc storage means, preferably a capacitance (CS), for storing dc electrical power for use by transponder circuitry; and
4. Circuitry, preferably in an integrated circuit IC form, which performs electronic function(s) of the transponder, and which may include rectifier means and transmitting means.

The antenna coil may also be used to simultaneously transmit data. The transponder design may allow for easy integration of almost all of the electrical circuitry of the transponder.

The transponder may further include rectifying means (D), which may be in the form of a diode, for rectifying received power. The preferred rectifier is a synchronous rectifier as disclosed in copending Australian Provisional Application No. PI 5507, entitled "Integratable Synchronous Rectifier", filed Nov. 19, 1987. The rectifier disclosed therein is readily integratable into the transponder's IC. The addition of more complicated rectifying structures such as bridge rectifiers may be unnecessary, since they may not substantially improve the dc conversion efficiency. The purpose of D is to rectify the AC signal received by the tuned antenna coil. The rectifying structure is positioned unconventionally within the transponder circuit and may allow for easier integration using standard commercial integration techniques and may allow the antenna coil to be further used as an RF or other signal radiator.

Internal to the interrogator is a stable master time reference source, typically a crystal controlled oscillator. This time reference source is used to operate the frequency of the powering field. As detailed above, the transponder's carrier oscillator is phase coherently locked to the master time reference in the interrogator through the interrogator's powering field. Phase coherent locking of the signal carrier to the master time reference provides substantial advantages over non-coherent carrier generation. The carrier signal can be coherently detected at the interrogator using well understood coherent detection principles with the master time reference serving as the frequency reference to the coherent detection circuits. Coherent detection provides optimum signal to noise detection, excellent interference suppression and sideband rejection. FIG. 1 shows this time reference signal being fed to the "receiver and decoder" circuitry in the interrogator. The time reference signal is used by the "frequency and phase" controller to generate the frequency of the powering field.

A storage capacitor, a preferred form of storage means (CS), may be used to store the dc electrical power periodically supplied by the tuned circuit and diode D. CS stores this pulsed electrical power and may deliver a substantially constant DC voltage to the transponder circuitry via the supply rail. A switch means (T), which may be part of the modulator means, and may preferably comprise a MOS transistor incorporated into the transponder circuitry. A modulating signal may be drivingly coupled to the gate of T. The drain of T may be coupled to the pickup coil and may be adapted to draw a current through all (or part of, depending upon the configuration) of the pickup coil. The current may induce an RF magnetic field in the coil which may radiate a signal or code modulated signal to receiving structure(s) adapted to receive this signal. The timing reference point (TR) of the powering field or other signal information from the powering field which may be used as a timing reference for any of the transponder circuitry, preferably the carrier oscillator(s). The carrier oscillator(s) may, however, be preset and therefore the timing reference may have other applications within the transponder, for example, enabling means or data means, programming electrically erasable memory (such as EEPROM) where the peak reference potential (twice the supply voltage) could be required for memory programming.

The (tuned) coil circuit may be tuned to the power frequency, rather than the RF frequency. RF current may be drawn through the top turns of the tap from the supply capacitance (CS) during transponder transmission. Only one coil (with a tap) may be necessary. A tuning capacitance (CT) may be coupled to the pickup coil structure to which the DC storage capacitance (CS) may also be coupled. The rectifier is conveniently shown as a diode D the preferred integratable form is a synchronous rectifier.

In particular, FIG. 4 shows an illustration of the relationship between the inductive pickup (coil), tuning capacitor (CT), storage capacitor (CS), rectifier (D), timing reference (TR), switch (T), supply rail (+) and some transponder circuitry. The transponder preferably incorporates an integrated circuitry (IC) which includes any necessary electronic functions. The IC may monitor the voltage induced in the pickup coil at the time reference point TR. The carrier oscillator may be a phase locked high frequency oscillator, the output of which may be used as a data carrier for transmitting information. Simple multiplication of the power frequency by the oscillator may not be advantageous because harmonics generated by the power field will interfere with the oscillator's signal carrier. The oscillator may be designed to generate substantially phase coherent frequencies between harmonics of the powering field's frequency. For example, $$\text{Oscillator output} = \left( p + \frac{n}{m} \right) \times \text{frequency of powering field}$$

where:

p is a harmonic of the powering field's frequency
n and m are integers with m<m.

FIGS. 7A to 7H show preferred schematic embodiments of portions of the transponder as shown before in functional block form. The 'MAG MOD' signal shown in FIG. 7B (and FIG. 6) is the magnetic modulation signal. This modulation may be superimposed on the powering field. The preferred form of magnetic modulation is frequency shift keying (FSK). FSK'ing the magnetic field does not alter the power received by the antenna coil. When the antenna coil is tuned there is a slight frequency dependent reduction in power conversion. This is very small for low deviation FSK and low Q tuning of the antenna coil. FSK signalling with the power field is particularly useful providing simultaneous power transmission to, and data reception by, the transponder antenna completely independent of each function.

The signal may provide a basis for control of the transponder and/or, more specifically, enable control of preset data or other signals and/or to initiate programming or other functions of circuits in the transponder. Embodiments of carrier oscillator are shown in FIGS. 7A and 7B. The point TR provides the input for the carrier oscillator. Embodiments as shown in FIGS. 7G and 7H may also be used in the transponder, and may provide an ability to randomly select a carrier frequency from a set of available carrier frequencies. This random selection may aid in transponder/base station communication when the transponder is used in a multiple transponder system. The output of the carrier oscillator may be divided down to provide a logic clock signal (also shown in FIGS. 5A, 5B and 6A, 6B). A divided output may provide a logic signal even when the timing reference is momentarily unavailable. The carrier oscillator may be designed to remain substantially stable during short interruptions to the timing reference signal. The timing reference may be divided down and used directly as a clock signal.

As shown in FIGS. 4, 4A, 5A, 5B, 6A, 6B and 7E, the logic clock may be used to derive a preset, pre-programmed, alterable or selectable code from a set of logic gates or memory. This code may be used to modulate the carrier signal. Phase modulation is a preferred implemented modulation technique. A simple EXCLUSIVE OR gate (FIG. 7F) may be used to phase modulate the carrier, however, amplitude, pulse position, pulse width or any other modulation may be possible. The modulated carrier signal may be used to drive the gate of T, which may operate in its saturated region i.e.: like a current source, and may draw a fixed magnitude current at the carrier frequency. This current may generate a magnetic field oscillating at the carrier frequency which will radiate from the transponder.

Figure 16A:
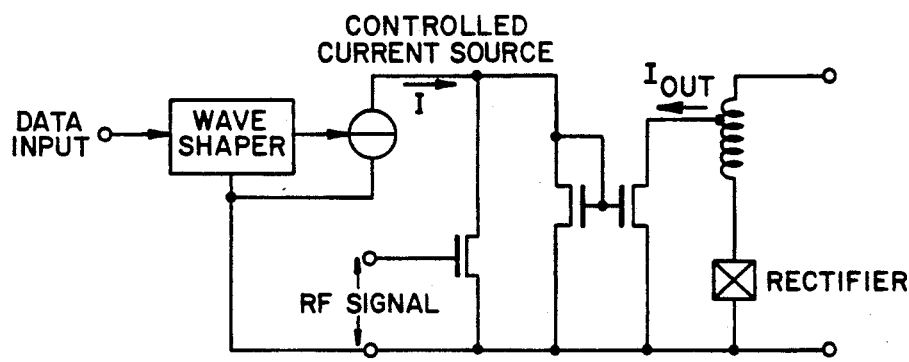
Figure 16B:
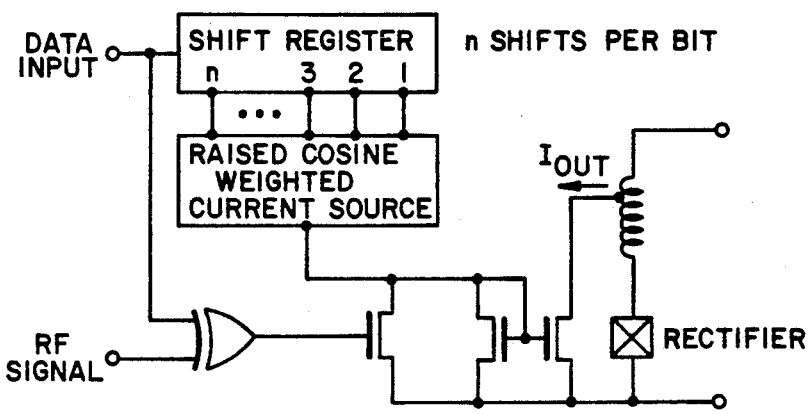

Alternatively a current mirror drive can drive the output transistor and the mirror current can be modulated to deliver envelope shaped bandwidth limited RF data to the antenna. Envelope shaping of RF modulated data provides good sideband suppression and normally necessitates the use of complex filters to generate it. However the current mirror readily lends itself to waveshape synthesis. FIG. 16A shows a basic schematic of an integratable circuit for waveshape synthesis, 16B shows a more detailed circuit capable of synthesizing a band limited data signal. The use of current summing either through current mirrors and/or through parallel output transistors allows (1) many frequencies and data patterns to be transmitted simultaneously.

(2) Envelope waveshaping of signals to provide band-limiting of the transmitted signal.

With reference to FIGS. 5A, 5B and 6A, 6B note that the divider may be connected to a time base input or to the carrier oscillator.

A transducer when powered, may begin to transmit its code or other information. Transmission may be selectably switched. Transmission may also be continuous while the transducer is receiving a power field. The transmission may be based on a preferably randomly selected frequency or frequencies, from a possible set of frequencies or transmission breaks.

The carrier frequency(s), the output of the oscillator means, may be generated by one or more voltage controlled oscillators (VCO's), each in a phase locked loop configuration controlled by the inductive powering frequency. As aforementioned, the output carrier frequency may be substantially equal to $$\left( p + \frac{n}{m} \right) \times \text{frequency of inductive power field.}$$

Provided n is less than m, the carrier frequency may never be equal to a harmonic of the powering frequency. Consequently, the powering field's harmonics may never interfere with the carrier transmissions. By appropriately selecting n, the carrier frequency may be set. Various carrier frequencies may be generated by either using one oscillator and adjusting n as required or having many selectable oscillator(s) each with a different preset n generating one of the required carrier frequencies.

Control of the selection of a carrier frequency(s) and/or transmission break(s) may be accomplished with varying degrees of complexity by implementation of the selection circuitry. In one embodiment, a pulse of modulation (MAG MOD), on the powering field, may cause a transponder to randomly select a carrier frequency or transmission break. By appropriate coding of the modulation of the powering field, coupled with suitable detection and decoding circuitry on the transponder, more elaborate selection schemes or communication methods may be implemented. For example, a transponder may be forced off air or the carrier frequency of a particular transponder may be changed. Frequency, phase, amplitude or pulse modulation or any combinations of these may be used to modulate the inductive powering field.

A transponder may randomly select either a transmission break or carrier frequency. Arbitrary probability weightings may also be assigned to each carrier frequency and/or idle state. Selection may be made following the transmission of a complete code or data word. In this manner, the carrier frequency of the transponder may be altered after each completed code or data word transmission. Also, the transmission of more than one code or data word before reselecting the carrier frequency may be possible.

The modulator shown in the various Figures may comprise an EXCLUSIVE-OR gate. If so, the RF output consists of Binary Phase Shift Keyed data (BPSK). Other more complicated modulator embodiments may require Quadrature Phase Shift Keying (QPSK). AM or FM modulators may also be used.

A one, two or three dimensional antenna base structure may be used to radiate the powering field for the transponder.

For an arbitrarily modulated oscillating impinging powering field, the modulation rate may be limited by the bandwidth of the transponder. This may be sufficiently large to allow a data rate of any required number of kilobits per second. Preferably, the magnetic field may be phase or frequency modulated as these may not affect the power transmission from the base station to the transponder. Amplitude, pulse width or pulse position modulation may also be used.

Figure 8A:
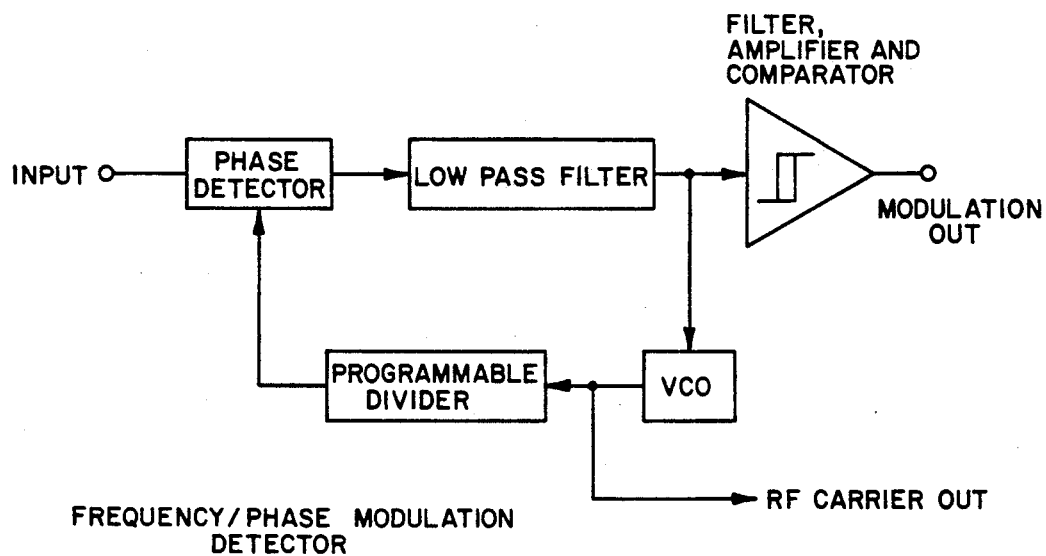
FIGS. 8A and 8B show two embodiments of a modulation detector.
Figure 8B:
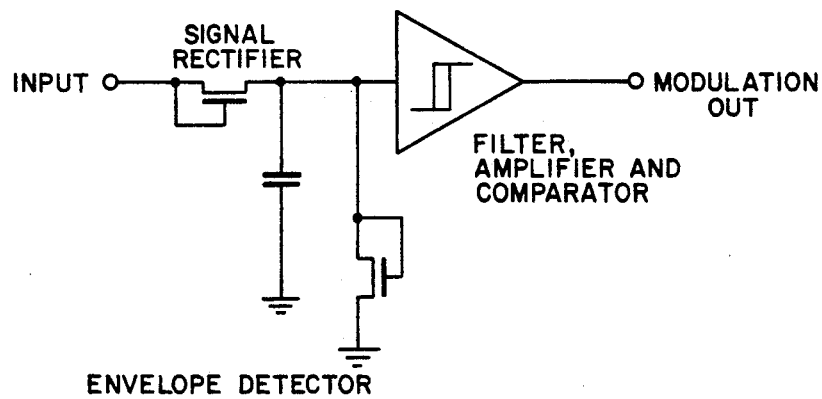

In a transponder, a phase locked loop may extract the phase or frequency modulation, while a simple envelope detector or other means may be used to detect amplitude or pulse modulation. FIGS. 8A to 8B.

The oscillating magnetic field may be generated by an oscillator with a tuned coil. Tuning may be essential for supplying large coil currents at low input voltages. A high Q coil may be used for more efficient operation. The intrinsic properties of a high Q tuned coil require special attention if high speed modulation of the magnetic field is required.

Figure 9A:
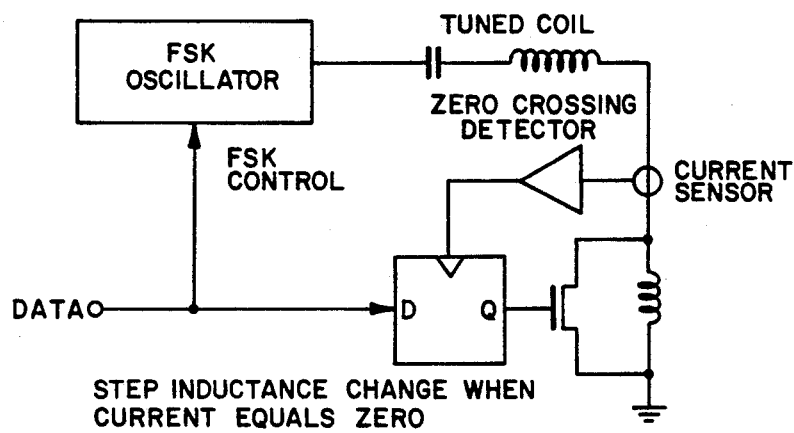
FIGS. 9A and 9B show various embodiments of an inductive modulator for use in the present invention.
Figure 9B:
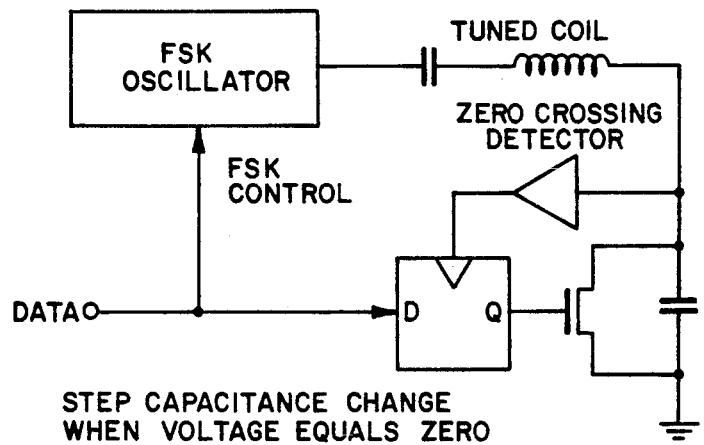

For generation of phase or frequency modulation, the instantaneous operating frequency of the tuned coil may be changed by either a step change in the coil inductance or tuning capacitance. Any step inductance change may preferably occur when the coil current is zero while any step capacitance change may preferably occur when the capacitor voltage is zero. Examples of switching schemes, to alleviate any circuit transient responses are shown in FIGS. 9A and 9B. In the case of phase modulation, the phase angle may slip at a linear rate when a step frequency change is made. When the required phase angle slippage is reached, the operating frequency is returned to its nominal value and the phase slippage ceases.

Figure 10A:
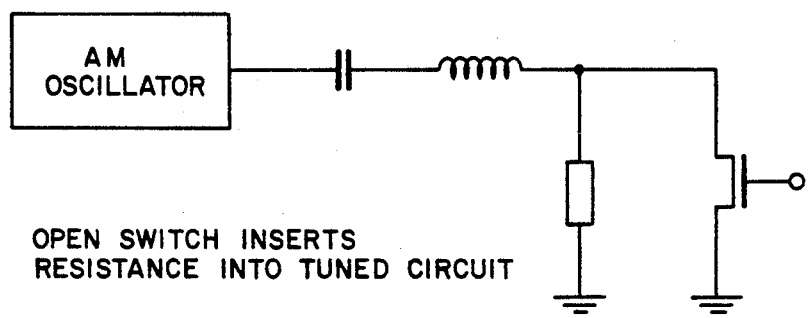
FIGS. 10A to 10C show further embodiments of an inductive modulator for use in the present invention.
Figure 10B:
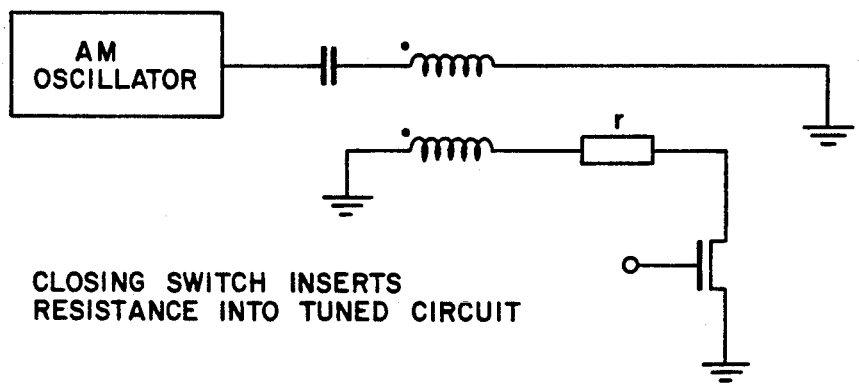
Figure 10C:
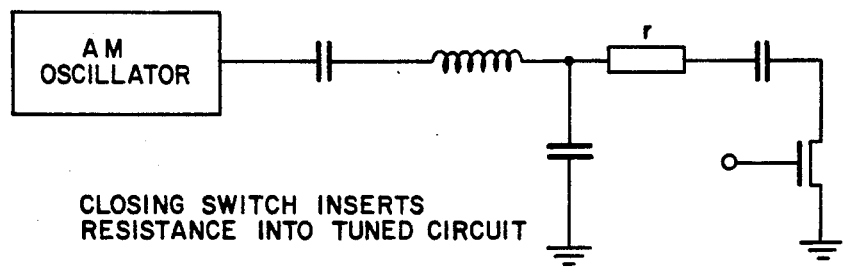

With reference to FIGS. 10A to 10C, when amplitude or pulse modulation is used, the coil Q may mitigate against rapid changes in the coil current. When appropriate, the coil Q may be artificially lowered by inserting extra loss in to the coil. This may be done by either directly, inductively or capacitively introducing extra resistance in to the tuned circuit. For amplitude modulation, reductions in the coil current magnitude may be sped up by switching in an extra resistor. For pulse modulation, the resistor may be connected after the signal source has been disconnected. The resistor may rapidly quench the coil current. After the appropriate time interval has elapsed the signal source may be re-activated and the coil current may be re-established. For amplitude or pulse modulation, the resistance may be replaced by the power supply so that instead of dumping the magnetic energy as heat it may be returned for reuse by the power supply.

The simultaneous action of power transfer and data or command transmission by the same magnetic field may allow the remote control of electromechanical devices and electronic circuits, for example, the remote programming of EEPROM or conventional CMOS memory in a known manner.

Figure 17:
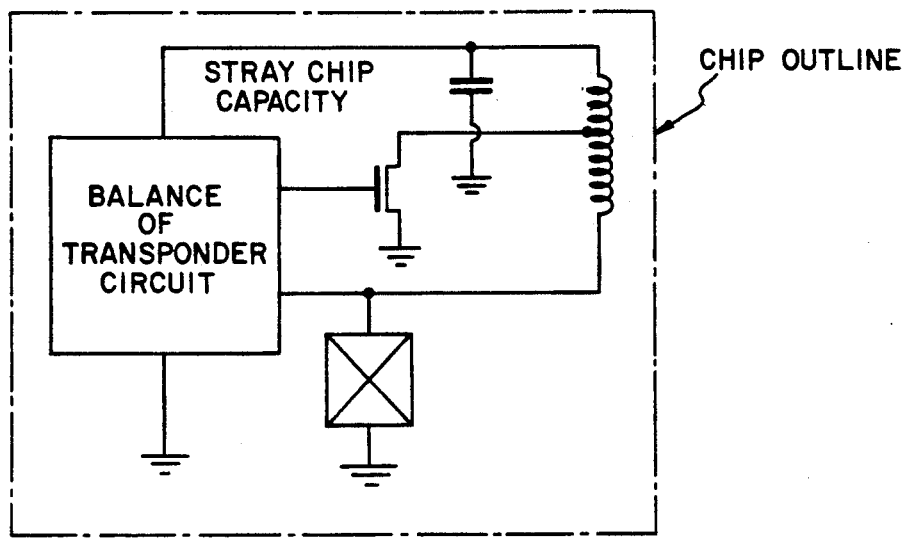
FIGS. 17 and 18 refer to an embodiment of the present invention in which all of the transponder circuitry including the antenna is incorporated onto a single chip.
Figure 18:
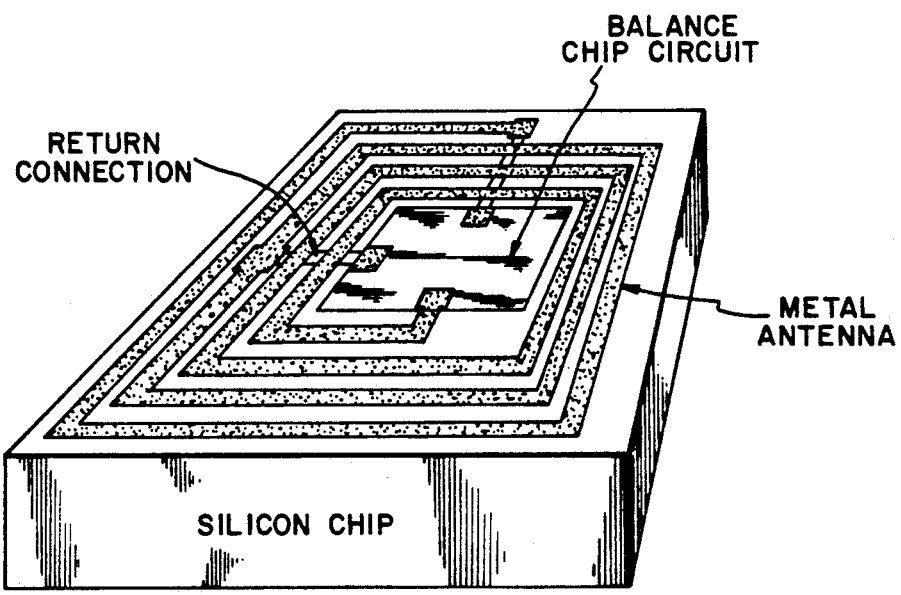

FIGS. 17 and 18 refer to, an embodiment of the present invention in which all of the transponder circuitry including the antenna are incorporated onto a single chip. Such an embodiment is ideally suited to smart card applications e.g. credit, debit and token cards where the chip to interrogator coupling can be arranged to be strong enough to power the chip from such a small antenna. Strong coupling ensures that there is sufficient voltage without tuning. Tuning magnifies the voltage induced in the antenna coil by the "Q" of the tuned circuit, typically 5 for this type of antenna. The storage capacitor is realized using the stray capacity of the chip i.e. leads, pads, metalisation and by making capacitors on any spare chip area.

The present invention remarkably provides a device adapted for simultaneous power reception, data reception and signal transmission from a single inductive means. The present invention is substantially entirely adapted for integration. The present invention provides a unique circuit combination and/or configuration. The present invention is particularly adapted for use in a transponder, however, the general applicability of the present invention should not be limited to a transponder.

What is claimed is:

1. A device comprising:
    inductive coil means for receiving and transmitting, said inductive coil means having a first portion and a second portion;
    said first portion adapted to receive first signals from an external magnetic field generated at a first frequency, wherein said first signals are any one of power signals and information signals;
    means for generating second information signals at a second frequency, said means for generating second information signals being coupled to said inductive coil means at said second portion;
    said second portion being adapted to transmit said second information signals at said second frequency simultaneously and independently of said first signals, wherein said second portion overlaps at least a part of said first portion.

2. A device as in claim 1, wherein said means for generating said second information signals is a current source.

3. A device as in claim 2, further comprising:
rectifier means for rectifying said first signals, said rectifier means coupled at one end to said inductive coil means, wherein another end of said rectifier means and said current source are connected to the same DC potential.

4. A device as claimed in claim 3, wherein the another end of said rectifier means is coupled to a DC reference potential.

5. A device as claimed in claim 3, wherein said inductive means has at least three connection points,
the first coupling to said current source,
the second coupling to said rectifier means, and
the third coupling to another DC potential.

6. A device as claimed in claim 4, wherein said inductive means has at least three connection points,
the first coupling to said current source,
the second coupling to said rectifier means, and
the third coupling to a DC voltage potential.

7. A device as in claim 1, wherein said means for generating second information signals includes means for injecting a code modulated current.

8. A device as in claim 7, wherein said means for generating second information signals further includes a current source.

9. A device as in claim 8, further comprising:
rectifier means for rectifying said first signals, said rectifier means coupled at one end to said inductive coil means, wherein another end of said rectifier means and said current source are connected to the same DC potential.

10. A device as claimed in claim 9, wherein the another end of said rectifier means is coupled to a DC reference potential.

11. A device as claimed in claim 9, wherein said inductive means has at least three connection points,
the first coupling to said current source,
the second coupling to said rectifier means, and
the third coupling to another DC potential.

12. A device as claimed in claim 10, wherein said inductive means has at least three connection points,
the first coupling to said current source,
the second coupling to said rectifier means, and
the third coupling to a DC voltage potential.

13. A device as in claim 1, wherein said first signal is a power signal to be rectified for providing operating power to said device through a power storage means coupled to said inductive coil means.

14. A device as in claim 1, wherein said first portion receives both power signals and information signals.

15. A device as in claim 13, wherein said first signal is a modulated powering signal.

16. A device as claimed in claim 15, wherein the modulation is in the form of frequency shift keying.

17. A device as in claim 1, wherein said means for generating second information signals at a second frequency generates radio frequencies.

18. A device as in claim 9, wherein said means for generating second information signals at a second frequency generates radio frequencies.

19. A device as in claim 7, wherein said second portion includes a plurality of transmitting sections, and wherein a corresponding plurality of means for injecting a code modulated current is coupled to said transmitting sections for injecting a plurality of code modulated currents at different frequencies simultaneously into and for transmission by said second portion.

20. A device as in claim 19, wherein said means for injecting a plurality of code modulated currents includes a plurality of current sources.

21. A device as in claim 19, wherein said means for injecting a plurality of code modulated currents includes means for transmitting the same information at said different frequencies and means for transmitting different information at said different frequencies.

22. A device as in claim 2, wherein said current source includes means for current summing selected from a set of current mirrors or parallel output transistors.

23. A device as in claim 1, including electronic circuit means for storing information signals coupled to said means for generating second information signals.

24. A device as claimed in claim 3 wherein said rectifier means is a zener diode.

25. A device as in claim 1, further comprising:
oscillator means coupled to said means for generating second information signals; and
modulator means coupled to said oscillator means.

26. A device as claimed in claim 25 wherein said oscillator means is arranged to generate substantially phase coherent frequencies between harmonics of the first frequency.

27. A device as claimed in claim 26 further comprising frequency selector means coupled to said oscillator means.

28. A device as claimed in claim 1 wherein said inductive coil means is tuned coil means.

29. A device as in claim 1, further comprising:
charge storage means coupled to said inductive coil means for storing power received from said first signal; and
regulator means coupled to said charge storage means for regulating the power received by said charge storage means.

30. A device as in claim 1, incorporated into a transponder.

31. A device as claimed in claim 1, further comprising shunt regulator means coupled across said inductive coil means.

32. A device as in claim 1, wherein said device is substantially wholly integratable apart from the inductive coil means.

33. A device as claimed in claim 1, wherein said device is substantially wholly integratable.

34. A device as in claim 1, wherein said device is incorporated into an identification label.

35. A transponder for communicating with a base section, said base section adapted for at least one of powering and interrogation of the transponder, said transponder comprising:
inductive means having a first portion for receiving an inductive powering field of a first frequency, said field inducing a first signal in said first portion,
rectifier means for rectifying said first signal, said rectifier means being coupled between one side of said inductive means and a reference potential point,
storage means for storing the rectified first signal in the form of a voltage, said storage means being coupled between another side of said inductive means and said reference point, said another side of said inductive means being a voltage potential point when said inductive means receives said inductive powering field, said storage means adapted to provide voltage to said voltage point, and driver means being selectively coupled to said inductive means enabled to provide a conductive path through at least a second portion of said inductive means such that, when said conductive path is provided, a current produces, in at least said second portion, a second signal irradiating at a second frequency, said inductive means being adapted to simultaneously receive said inductive powering field in said first portion and the second portion of the inductive means overlapping at least a part of the first portion.

36. A device as in claim 35 wherein said inductive means additionally simultaneously and independently receives a third signal, said third signal being received in said first portion of said inductive means.

37. A transponder as claimed in claim 35, wherein said driver means is a current source.

38. A transponder as claimed in claim 35 wherein said second signal is frequency independent of said first signal.

39. A transponder as claimed in claim 37, wherein said second signal is frequency independent of said first signal.

40. A transponder as claimed in claim 39, wherein said second signal is coherently generated from said first signal.

41. A transponder as claimed in claim 35, wherein the second signal is an RF signal.

42. A transponder as claimed in claim 36, wherein the third signal is an FSK signal.

43. A transponder as claimed in claim 35, wherein the inductive means is a coil or tuned circuit.

44. A device as in claim 37, wherein said current source includes means for current summing selected from a set of current mirrors or parallel output transistors.

45. A device as in claim 35, wherein said driver means includes means for injecting a code modulated current.

46. In combination, inductive field receiving means, driver means coupled to said inductive field receiving means, rectifier means coupled to said inductive field receiving means and charge storage means coupled to said inductive field receiving means, said combination providing a passive transponder, and said receiving means having a first portion for receiving an inductive powering field of a first frequency and being adapted to provide power for transmitting an information signal when under the influence of the inductive powering field, wherein said receiving means also includes a second transmitting portion arranged to transmit said information signal at a second frequency, simultaneously and independently of the first signal, the first and second portions at least partially overlapping each other.

47. A device as in claim 46, further comprising a current source including means for current summing selected from a set of current mirrors or parallel output transistors.

48. A combination as claimed in claim 46 wherein said driver means comprises a current source.

49. A combination as claimed in claim 46, provided in a single integrated chip form.

50. A device comprising:
a single inductive coil having a first portion and a second portion;
said first portion adapted to receive first signals from an external magnetic field generated at a first frequency, wherein said first signals are any one of power signals and information signals;
means for generating second information signals at a second frequency coupled to said second portion;
said second portion adapted to transmit said second information signals at said second frequency simultaneously and independently of said first signals, wherein said second portion at least partially overlaps said first portion.

51. A device as in claim 7, further comprising:
rectifier means for rectifying, said rectifier means coupled to one end of said coil and to a reference voltage;
wherein said means for generating said second information signals is a current source coupled to said second portion.

52. A device as in claim 1, wherein said inductive means comprises a single inductive coil.

53. A device as in claim 28, wherein said inductive means comprises a single inductive coil.

54. A device as in claim 2, wherein said inductive means comprises a single inductive coil.

55. A device as in claim 3, wherein said inductive means comprises a single inductive coil.

56. A device as in claim 1, wherein said first frequency is an RF frequency.

57. A device as in claim 7, wherein said first frequency is an RF frequency.

58. A device as in claim 1, wherein said second frequency is an RF frequency.

59. A device as in claim 7, wherein said second frequency is an RF frequency.

60. A device as in claim 1 wherein said device is a passive transponder.

61. A device as in claim 1 wherein said device is an identification device.

62. A device as in claim 1 wherein said device is a smart card.

* * * * *